US012602455B2

(12) United States Patent
Chen

(10) Patent No.: US 12,602,455 B2
(45) Date of Patent: Apr. 14, 2026

(54) AUTHENTICATION METHOD AND RECORDING MEDIUM

(71) Applicant: Panasonic Intellectual Property Management Co., Ltd., Osaka (JP)

(72) Inventor: Chaoyun Chen, Kanagawa (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 129 days.

(21) Appl. No.: 18/609,738

(22) Filed: Mar. 19, 2024

(65) Prior Publication Data

US 2024/0330415 A1 Oct. 3, 2024

(30) Foreign Application Priority Data

Mar. 29, 2023 (JP) ................................ 2023-054010
Dec. 13, 2023 (JP) ................................ 2023-210308

(51) Int. Cl.
*G06F 21/10* (2013.01)
*G06F 21/44* (2013.01)

(52) U.S. Cl.
CPC ........ *G06F 21/107* (2023.08); *G06F 21/1011* (2023.08); *G06F 21/44* (2013.01)

(58) Field of Classification Search
CPC .... G06F 21/107; G06F 21/1011; G06F 21/44; G06F 21/105
See application file for complete search history.

(56) References Cited

U.S. PATENT DOCUMENTS

| | | | | |
|---|---|---|---|---|
| 7,725,712 B2 * | 5/2010 | Ginzburg | ................ | G06F 21/36 |
| | | | | 713/185 |
| 7,809,944 B2 * | 10/2010 | Kawamoto | ........... | H04L 9/3263 |
| | | | | 713/168 |
| 8,700,533 B2 * | 4/2014 | Levin | ..................... | G06Q 50/18 |
| | | | | 705/57 |
| 9,003,541 B1 * | 4/2015 | Patidar | .................. | G06F 21/121 |
| | | | | 713/172 |
| 9,881,148 B2 * | 1/2018 | Hagiwara | ................ | G06F 21/31 |
| 10,402,550 B2 * | 9/2019 | Uchida | ............... | G06F 3/04886 |
| 2006/0143135 A1 * | 6/2006 | Tucker | .................. | G06F 21/121 |
| | | | | 705/59 |
| 2007/0026942 A1 * | 2/2007 | Kinsley | .............. | G07F 17/3269 |
| | | | | 463/29 |

(Continued)

FOREIGN PATENT DOCUMENTS

| | | |
|---|---|---|
| JP | 2014-016659 A | 1/2014 |
| JP | 2015-001935 A | 1/2015 |

(Continued)

*Primary Examiner* — David Garcia Cervetti
(74) *Attorney, Agent, or Firm* — Rimon P.C.

(57) ABSTRACT

An authentication method is performed by a device to authenticate a license of software that is installed on the device and managed by a server. The authentication method includes: presenting unique authentication information that is unique to the software; receiving input of server authentication information generated by the server based on: license information of the software managed by the server in association with the unique authentication information; and the unique authentication information; and authenticating the license of the software based on the unique authentication information and the inputted server authentication information.

14 Claims, 18 Drawing Sheets

(56) References Cited

U.S. PATENT DOCUMENTS

| | | | | |
|---|---|---|---|---|
| 2007/0265982 A1* | 11/2007 | Kalervo | .................. | G06F 21/10 |
| | | | | 705/59 |
| 2008/0301771 A1* | 12/2008 | Kawai | .................. | G06F 21/125 |
| | | | | 726/2 |
| 2009/0151006 A1* | 6/2009 | Saeki | .................. | G06F 21/1012 |
| | | | | 726/28 |
| 2009/0183229 A1* | 7/2009 | Ohnishi | .................. | G06F 21/10 |
| | | | | 726/2 |
| 2009/0187986 A1* | 7/2009 | Ozeki | .................... | G06F 21/36 |
| | | | | 726/21 |
| 2009/0241107 A1* | 9/2009 | Kobayashi | ............. | G06F 21/10 |
| | | | | 726/28 |
| 2009/0326964 A1* | 12/2009 | Garg | ....................... | G06F 21/10 |
| | | | | 707/E17.014 |
| 2010/0023412 A1* | 1/2010 | Kitagawa | .......... | G06Q 30/0601 |
| | | | | 705/26.1 |
| 2010/0161837 A1* | 6/2010 | Miyajima | .......... | H04N 1/00973 |
| | | | | 710/8 |
| 2010/0318789 A1* | 12/2010 | Teal | .................... | H04L 63/0428 |
| | | | | 726/28 |
| 2011/0010779 A1* | 1/2011 | Nakagawa | ............. | H04L 63/12 |
| | | | | 726/30 |
| 2011/0023126 A1* | 1/2011 | Hayami | ................. | G06F 21/10 |
| | | | | 726/26 |
| 2011/0055904 A1* | 3/2011 | Tsutsumi | ............... | G06F 21/10 |
| | | | | 726/4 |
| 2011/0167503 A1* | 7/2011 | Horal | ................. | G06F 21/1011 |
| | | | | 726/33 |
| 2011/0265186 A1* | 10/2011 | Kwon | ................... | G06F 21/123 |
| | | | | 726/26 |
| 2012/0047559 A1* | 2/2012 | Yamamoto | ............. | G06F 21/10 |
| | | | | 726/3 |
| 2012/0079607 A1* | 3/2012 | Lal | ........................ | G06F 21/10 |
| | | | | 726/29 |
| 2012/0260334 A1* | 10/2012 | Nakai | .................. | G06F 21/629 |
| | | | | 726/20 |
| 2013/0167250 A1* | 6/2013 | Balasubramanian | ... | H04L 63/00 |
| | | | | 726/28 |
| 2013/0198734 A1* | 8/2013 | Biswas | ................. | G06F 21/105 |
| | | | | 717/174 |
| 2013/0332739 A1* | 12/2013 | Yi | ........................ | H04W 12/041 |
| | | | | 713/171 |
| 2013/0339731 A1* | 12/2013 | Rowles | ............... | H04L 63/0807 |
| | | | | 713/168 |
| 2015/0101059 A1* | 4/2015 | Galpin | .................... | G06F 21/12 |
| | | | | 726/26 |
| 2017/0262644 A1* | 9/2017 | Li | ......................... | H04L 63/168 |
| 2017/0277832 A1* | 9/2017 | Tseng | .................... | G16H 10/60 |
| 2017/0308686 A1* | 10/2017 | Takahara | ............. | G06F 21/105 |
| 2017/0323092 A1* | 11/2017 | Thakur | .................. | G06F 21/36 |
| 2018/0196965 A1* | 7/2018 | Torres | ................. | G06F 21/105 |
| 2018/0275979 A1* | 9/2018 | Shepherd | ............. | G06F 21/105 |
| 2018/0294980 A1* | 10/2018 | Baentsch | ............. | G06F 21/445 |
| 2018/0349576 A1* | 12/2018 | Dasgupta | ............. | G06F 21/121 |
| 2019/0147145 A1* | 5/2019 | Matsudaira | .......... | G06F 21/105 |
| | | | | 726/27 |
| 2019/0347383 A1* | 11/2019 | Lai | ........................ | G06F 21/121 |
| 2020/0019694 A1* | 1/2020 | Akiu | .................... | H04N 13/128 |
| 2020/0034163 A1* | 1/2020 | Park | .................... | G06F 3/04845 |
| 2020/0274978 A1* | 8/2020 | Tomiie | ............... | H04N 1/00801 |
| 2021/0056177 A1* | 2/2021 | Kozul | .................. | G06Q 30/0185 |
| 2021/0056179 A1* | 2/2021 | Hiratsuka | ................. | H04L 9/32 |
| 2021/0234973 A1* | 7/2021 | Hou | .................. | H04N 1/00244 |
| 2021/0334341 A1* | 10/2021 | Roberts | ................. | G06F 21/105 |
| 2022/0004603 A1* | 1/2022 | Jeong | ..................... | G06F 21/31 |
| 2022/0012310 A1* | 1/2022 | Yan | ...................... | H04L 9/3231 |
| 2022/0019643 A1* | 1/2022 | Sikri | ..................... | G06F 21/121 |
| 2022/0256220 A1* | 8/2022 | Miyahara | ............. | H04N 21/266 |
| 2022/0284134 A1* | 9/2022 | Ogi | ....................... | G06F 21/121 |
| 2022/0318345 A1* | 10/2022 | Bingham | ............. | G06F 21/105 |
| 2024/0012897 A1* | 1/2024 | Wu | ......................... | G06F 21/36 |
| 2025/0112792 A1* | 4/2025 | Imai | .................. | H04L 63/0869 |
| 2025/0209139 A1* | 6/2025 | Neifer | ................ | G06F 21/1014 |

FOREIGN PATENT DOCUMENTS

| | | | |
|---|---|---|---|
| JP | 2016-181035 A | 10/2016 |
| JP | 2020-024600 A | 2/2020 |
| JP | 2020-046815 A | 3/2020 |

* cited by examiner

FIG. 2

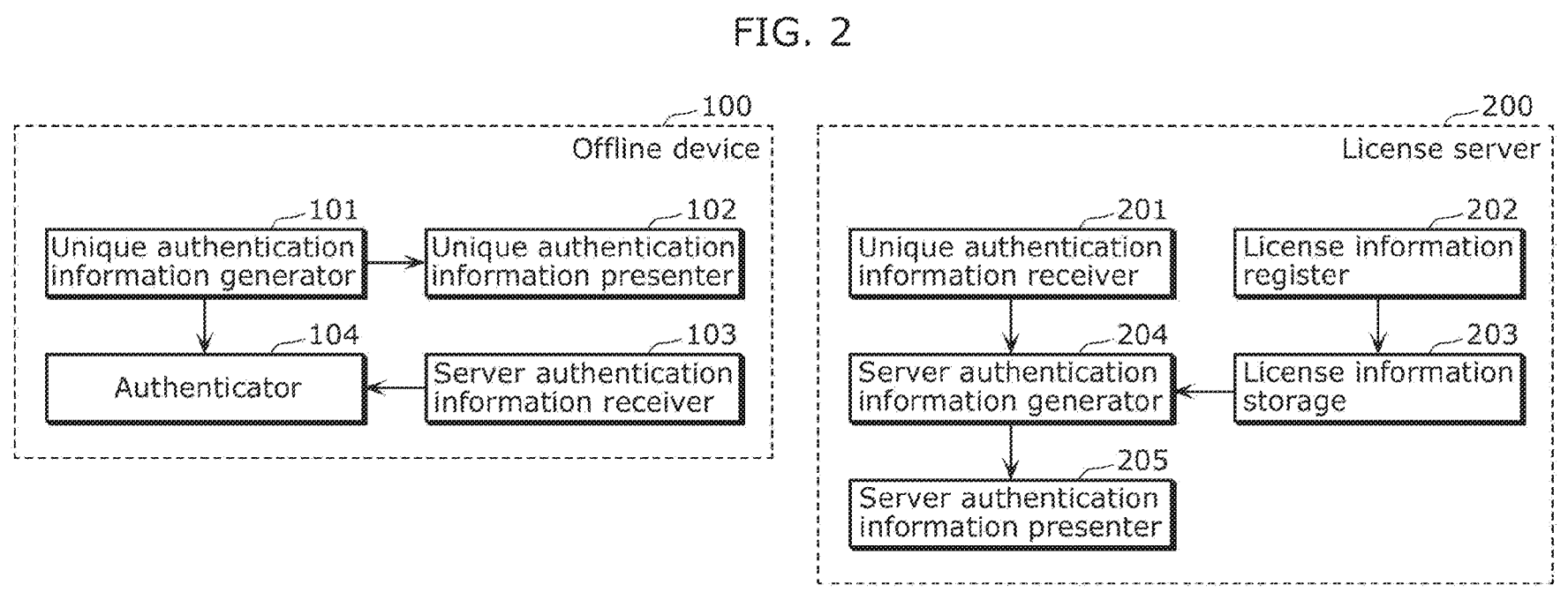

License server (200)

License information register (202) → License information storage (203)

Unique authentication information receiver (201) → Server authentication information generator (204) → Server authentication information presenter (205)

License information storage (203) → Server authentication information generator (204)

Offline device (100)

Unique authentication information generator (101) → Unique authentication information presenter (102)

Server authentication information receiver (103) → Authenticator (104)

FIG. 3

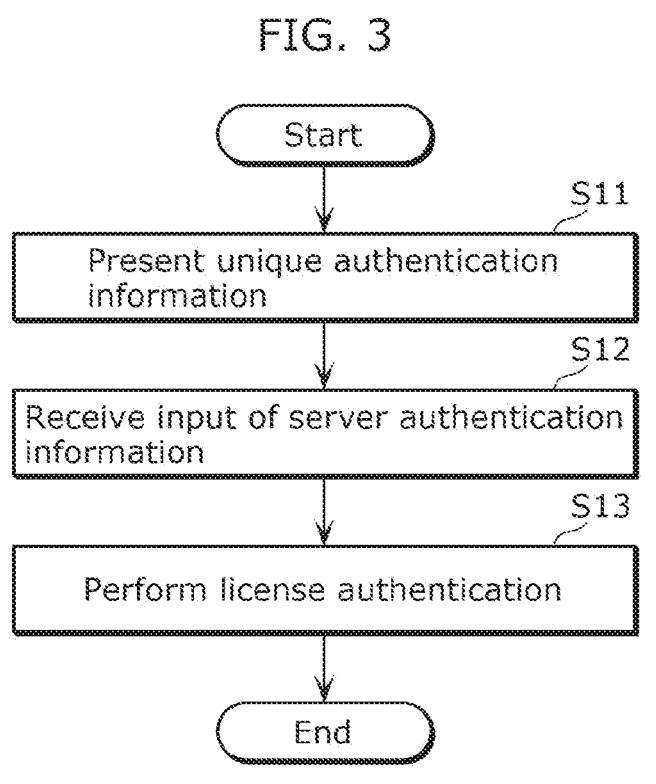

```
                    ┌──────────────┐
                    │    Start     │
                    └──────┬───────┘
                           │                        S11
                           ▼
        ┌──────────────────────────────────────┐
        │  Present unique authentication         │
        │  information                           │
        └──────────────────┬─────────────────────┘
                           │                        S12
                           ▼
        ┌──────────────────────────────────────┐
        │  Receive input of server authentication│
        │  information                           │
        └──────────────────┬─────────────────────┘
                           │                        S13
                           ▼
        ┌──────────────────────────────────────┐
        │  Perform license authentication        │
        └──────────────────┬─────────────────────┘
                           │
                           ▼
                    ┌──────────────┐
                    │     End      │
                    └──────────────┘
```

Input the following license information to license manager

Type :    RMS

Span:    2022/01/01 -  2023/01/01

Authentication

①Select license type & span

License type  ▼

Start date  🔲  –  End date  🔲

Next

Select authentication code

| m | n | 6 | 9 | O | 2 | u | 1 |

Input authentication information

| | ▼ | | | | | | | |

| J |
| m |
| A |
| 9 |

FIG. 14

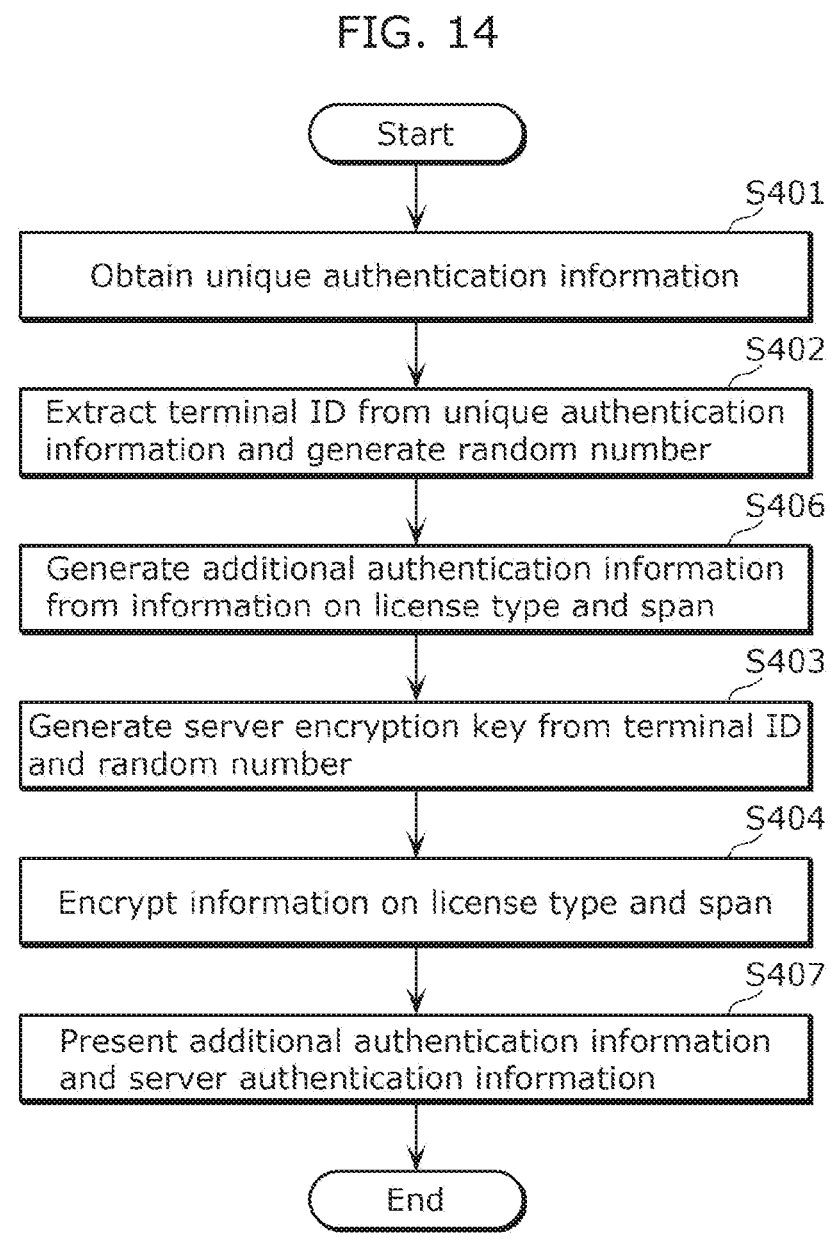

```
                    ┌─────────┐
                    │  Start  │
                    └────┬────┘
                         │
                         ▼                        S401
    ┌────────────────────────────────────────────┐
    │    Obtain unique authentication information  │
    └────────────────────┬─────────────────────── ┘
                         │
                         ▼                        S402
    ┌────────────────────────────────────────────┐
    │  Extract terminal ID from unique authentication│
    │  information and generate random number       │
    └────────────────────┬─────────────────────── ┘
                         │
                         ▼                        S406
    ┌────────────────────────────────────────────┐
    │  Generate additional authentication information│
    │  from information on license type and span    │
    └────────────────────┬─────────────────────── ┘
                         │
                         ▼                        S403
    ┌────────────────────────────────────────────┐
    │ Generate server encryption key from terminal ID│
    │ and random number                             │
    └────────────────────┬─────────────────────── ┘
                         │
                         ▼                        S404
    ┌────────────────────────────────────────────┐
    │   Encrypt information on license type and span │
    └────────────────────┬─────────────────────── ┘
                         │
                         ▼                        S407
    ┌────────────────────────────────────────────┐
    │  Present additional authentication information │
    │  and server authentication information        │
    └────────────────────┬─────────────────────── ┘
                         │
                         ▼
                    ┌─────────┐
                    │   End   │
                    └─────────┘
```

FIG. 16A

Authentication information

| c | N | T | y | m | n |

| 6 | 9 | O | 2 | u | 1 |

FIG. 16B

Input authentication information

FIG. 16C

Input authentication information

FIG. 19

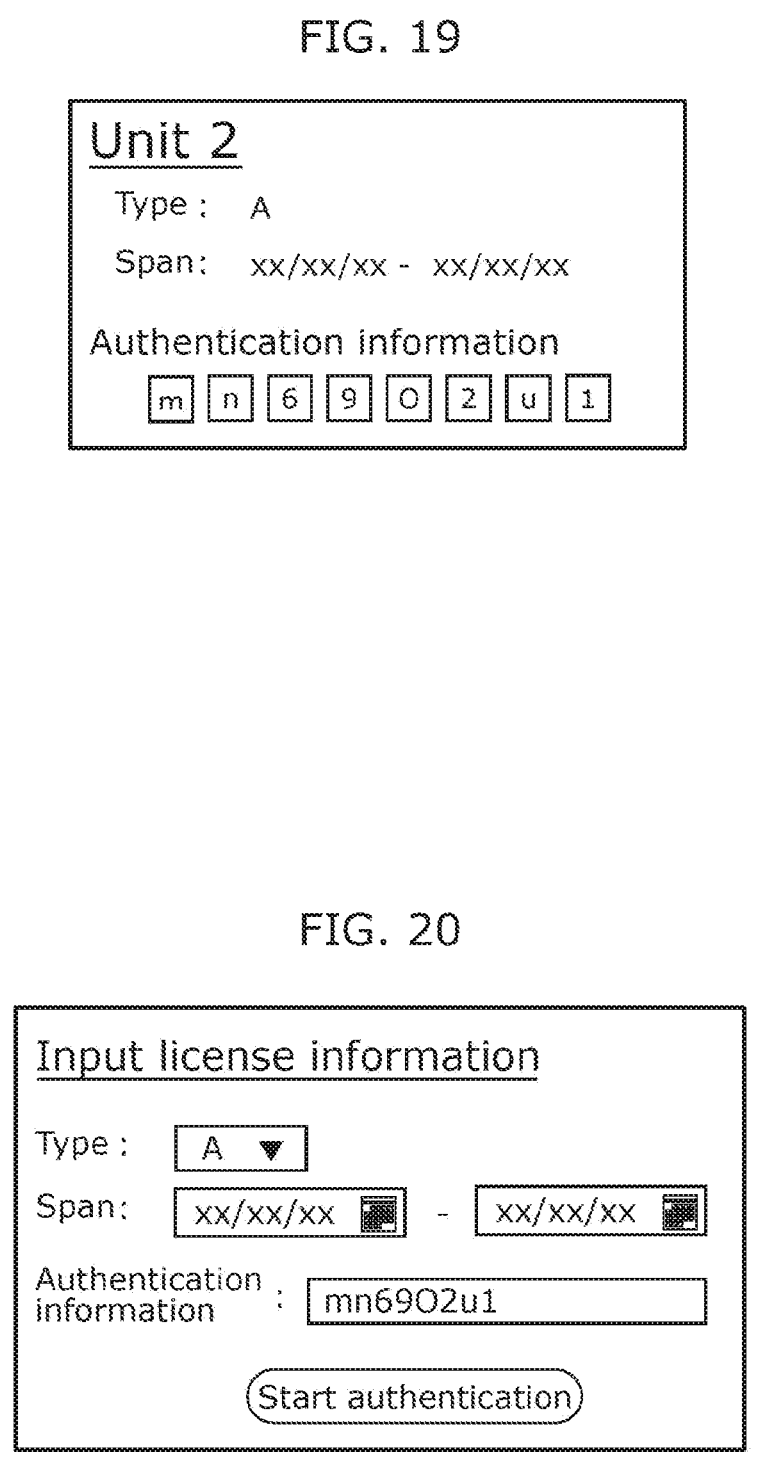

Unit 2

Type :   A

Span:   xx/xx/xx -  xx/xx/xx

Authentication information

| m | n | 6 | 9 | O | 2 | u | 1 |

FIG. 20

Input license information

Type :   [ A  ▼ ]

Span:   [ xx/xx/xx ▦ ]  -  [ xx/xx/xx ▦ ]

Authentication
information   :  [ mn69O2u1 ]

( Start authentication )

AUTHENTICATION METHOD AND RECORDING MEDIUM

CROSS REFERENCE TO RELATED APPLICATIONS

The present application is based on and claims priority of Japanese Patent Application No. 2023-054010 filed on Mar. 29, 2023, and Japanese Patent Application No. 2023-210308 filed on Dec. 13, 2023. The entire disclosure of the above-identified application, including the specification, drawings and claims is incorporated herein by reference in its entirety.

FIELD

The present disclosure relates to an authentication method and a recording medium for authenticating a license of software installed on a device.

BACKGROUND

Patent Literature (PTL) 1 discloses a technology of performing license authentication for a client terminal that is not connected to a network.

CITATION LIST

Patent Literature

PTL 1: Japanese Unexamined Patent Application Publication No. 2020-046815

SUMMARY

Technical Problem

The technology disclosed in PTL 1 needs to import a serial number (also called a key code). For frequent license authentication for example, the serial number needs to be imported each time. Such license authentication takes time and effort unfortunately.

In response to this, the present disclosure provides an authentication method that enables easy license authentication.

Solution to Problem

In accordance with an aspect of the present disclosure, an authentication method performed by a device to authenticate a license of software that is installed on the device and managed by a server includes: presenting unique authentication information that is unique to the software; receiving input of server authentication information generated by the server based on: license information of the software managed by the server in association with the unique authentication information; and the unique authentication information; and authenticating the license of the software based on the unique authentication information and the server authentication information inputted in the receiving.

In accordance with another aspect of the present disclosure, a non-transitory computer-readable recording medium having recorded thereon a computer program for causing a computer to execute the authentication method according to claim 1.

General or specific aspects of the present disclosure may be implemented to a system, a method, an integrated circuit, a computer program, a computer-readable recording medium such as a Compact Disc-Read Only Memory (CD-ROM), or any given combination thereof.

Advantageous Effects

The authentication method according to the present disclosure enables easy license authentication.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a configuration diagram illustrating an example of an offline device and a license server according to Embodiment.

FIG. 3 is a flowchart illustrating an example of the authentication method according to Embodiment.

FIG. 14 is a flowchart illustrating another example of the operation performed by the license server to generate and present the server authentication information in the second example.

FIG. 16A is a diagram illustrating an example of the presented additional authentication information and server authentication information in the second example.

FIG. 16B is a diagram illustrating an example of a screen for receiving input of the additional authentication information in the second example.

FIG. 16C is a diagram illustrating an example of a screen for receiving input of the server authentication information in the second example.

FIG. 19 is a diagram illustrating an example of the presented license information and server authentication information according to another embodiment.

FIG. 20 is a diagram illustrating an example of a screen for receiving input of the license information and input of the server authentication information according to another embodiment.

DESCRIPTION OF EMBODIMENT (Circumstances Leading to an Aspect of the Present Disclosure)

A typical method of authenticating a license of software installed on a device that is not connected to the Internet is performed as follows. More specifically, a user first purchases a license from a vendor of software and then inputs a key code to a device installed with the software. This allows the device to generate a volume serial number and present this volume serial number to the user. Then, the user transmits the volume serial number to a license server via, for example, a terminal connected to the Internet. The license server generates an activation code from the received volume serial number and transmits this activation code to the terminal. Using the activation code received by the terminal, the user activates the software installed on the device, which completes the license authentication.

For frequent license authentication, the aforementioned method takes time and effort unfortunately.

The following describes a license authentication method capable of reducing man-hours for license authentication.

Hereinafter, a certain exemplary embodiment will be described in detail with reference to the accompanying Drawings. However, unnecessarily detailed description may be omitted. For example, detailed explanation of a well-known matter and repeated description of substantially identical structures may be omitted. Such omission makes the following description exclude unnecessary redundancy and be easily understood by those skilled in the art.

It should be noted that the accompanying drawings and subsequent description are provided by the inventors of the present invention to facilitate sufficient understanding of the present disclosure by those skilled in the art, and are thus not intended to limit the scope of the subject matter recited in the claims.

EMBODIMENT

Hereafter, an authentication method according to Embodiment is described with reference to FIG. 1 to FIG. 18. A device installed with software performs the authentication method to authenticate a license of the software.

Figure 1:
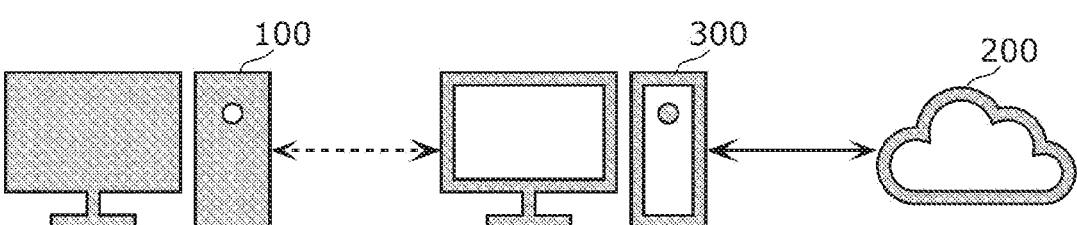
FIG. 1 is a diagram illustrating an example of a system that uses an authentication method according to Embodiment.

FIG. 1 is a diagram illustrating an example of a system that uses the authentication method according to Embodiment.

The system illustrated in FIG. 1 includes offline device 100, license server 200, and online device 300.

Online device 100 is an example of the device that performs the authentication method according to Embodiment and that is installed with software having a license to be authenticated. Offline device 100 is a personal computer (PC) or an electronic device that is not connected to the Internet, for example. License authentication of the software installed on offline device 100 can be performed even when offline device 100 is not connected to the Internet. License authentication of the software installed on offline device 100 is performed using, for example, online device 300.

Online device 300 is a device that is connected to the Internet, such as a mobile terminal or a PC. Online device 300 is communicatively connected to license server 200 by wire or wirelessly via a network.

License server 200 is an example of a server that manages the software installed on offline device 100.

FIG. 2 is a configuration diagram illustrating an example of offline device 100 and license server 200 according to Embodiment. Note that online device 300 is omitted from FIG. 2 and later configuration diagrams.

Offline device 100 is a computer that includes a processor and a memory. The memory includes a read only memory (ROM) and a random access memory (RAM) and is capable of storing programs executed by the processor. Structural components included in offline device 100 are implemented by, for example, the processor that executes the programs stored in the memory. Although FIG. 2 illustrates an example of the structural components included in offline device 100 according to Embodiment, specific configuration examples of offline device 100 are described in first to third examples below. As illustrated in FIG. 2, functional blocks of offline device 100 include unique authentication information generator 101, unique authentication information presenter 102, server authentication information receiver 103, and authenticator 104.

Unique authentication information generator 101 generates unique authentication information that is unique to each piece of software. The unique authentication information is unique to the software. One piece of software corresponds to one piece of unique authentication information on a one-to-one basis. In other words, unique authentication information of one piece of software is different from unique authentication information of another piece of software. For example, upon the installation of software on offline device 100, unique authentication information generator 101 generates a terminal ID unique to the software and defines the generated terminal ID as the unique authentication information. Here, the terminal ID refers to an ID that is randomly assigned when the software is installed on the terminal. Note that the unique authentication information may include a random number. In this case, unique authentication information generator 101 may generate a terminal ID and a random number, and then define information including the generated terminal ID appended with the random number as the unique authentication information.

Unique authentication information presenter 102 presents the unique authentication information to a person (hereafter, referred to as the "user") that executes license authentication. For example, unique authentication information presenter 102 displays the unique authentication information via a display. Note that unique authentication information presenter 102 may output the unique authentication information by sound via a loudspeaker, for example. An operation performed by unique authentication information presenter 102 is described in detail later.

Server authentication information receiver 103 receives input of server authentication information generated by license server 200. An operation performed by server authentication information receiver 103 is described in detail later.

Authenticator 104 performs license authentication of the software installed on offline device 100, based on the unique authentication information and the inputted server authentication information. An operation performed by authenticator 104 is described in detail later.

License server 200 is a computer that includes a processor and a memory. The memory includes a ROM and a RAM and is capable of storing programs executed by the processor. Structural components included in license server 200 are implemented by, for example, the processor that executes the programs stored in the memory. Although FIG. 2 illustrates an example of the structural components included in license server 200 according to Embodiment, specific configuration examples of license server 200 are described in the first to third examples below. As illustrated in FIG. 2, functional blocks of license server 200 include unique authentication information receiver 201, license information register 202, license information storage 203, server authentication information generator 204, and server authentication information presenter 205.

Unique authentication information receiver 201 receives the unique authentication information. For example, unique authentication information receiver 201 receives, via online device 300, the unique authentication information presented by offline device 100.

License information register 202 registers license information for each piece of software into license server 200 and stores the license information into license information storage 203. For example, license information register 202 registers the license information for each piece of software as a manager of license server 200 inputs the license information for each piece of software to a user interface of license server 200. The license information includes a license type, a license span, a license signer (user), and the number of devices signed up for the license, for example. For instance, license server 200 holds a management table indicating a correspondence between unique authentication information received by unique authentication information receiver 201 and license information of the software stored in license information storage 203. By reference to the management table, license server 200 is able to find which one of the pieces of software corresponds to the received unique authentication information.

Server authentication information generator 204 generates server authentication information, based on: the license information of the software managed by license server 200 in association with the unique authentication information; and the unique authentication information presented by offline device 100 and inputted to license server 200. An operation performed by server authentication information generator 204 is described in detail later.

Server authentication information presenter 205 presents the server authentication information to the user. For example, server authentication information presenter 205 transmits the server authentication information to online device 300, thereby allowing the server authentication information to be presented (for example, displayed) to the user via online device 300. Server authentication information receiver 103 of offline device 100 receives input of the server authentication information presented by server authentication information presenter 205.

FIG. 3 is a flowchart illustrating an example of the authentication method according to Embodiment. The authentication method is performed by offline device 100. Thus, the flowchart of FIG. 3 is also a flowchart illustrating an example of an operation performed by offline device 100 according to Embodiment.

Unique authentication information presenter 102 displays the unique authentication information unique to the software on a display of offline device 100 (Step S11). The process performed by unique authentication information presenter 102 is an example of presenting in the authentication method.

Next, server authentication information receiver 103 receives input of the server authentication information that is generated by license server 200 based on: the license information of the software managed by license server 200 in association with the unique authentication information; and the unique authentication information (Step S12). The process performed by server authentication information receiver 103 is an example of receiving server authentication information in the authentication method.

Then, authenticator 104 performs license authentication of the software, based on the unique authentication information generated by offline device 100 and the inputted server authentication information (Step S13). The process performed by authenticator 104 is an example of authenticating in the authentication method.

The following describes the first to third examples as the specific examples of the authentication method according to Embodiment, offline device 100, which performs the authentication method, and license server 200. First, the first example of the authentication method according to Embodiment, offline device 100, which performs the authentication method, and license server 200 is described.

Figure 4:
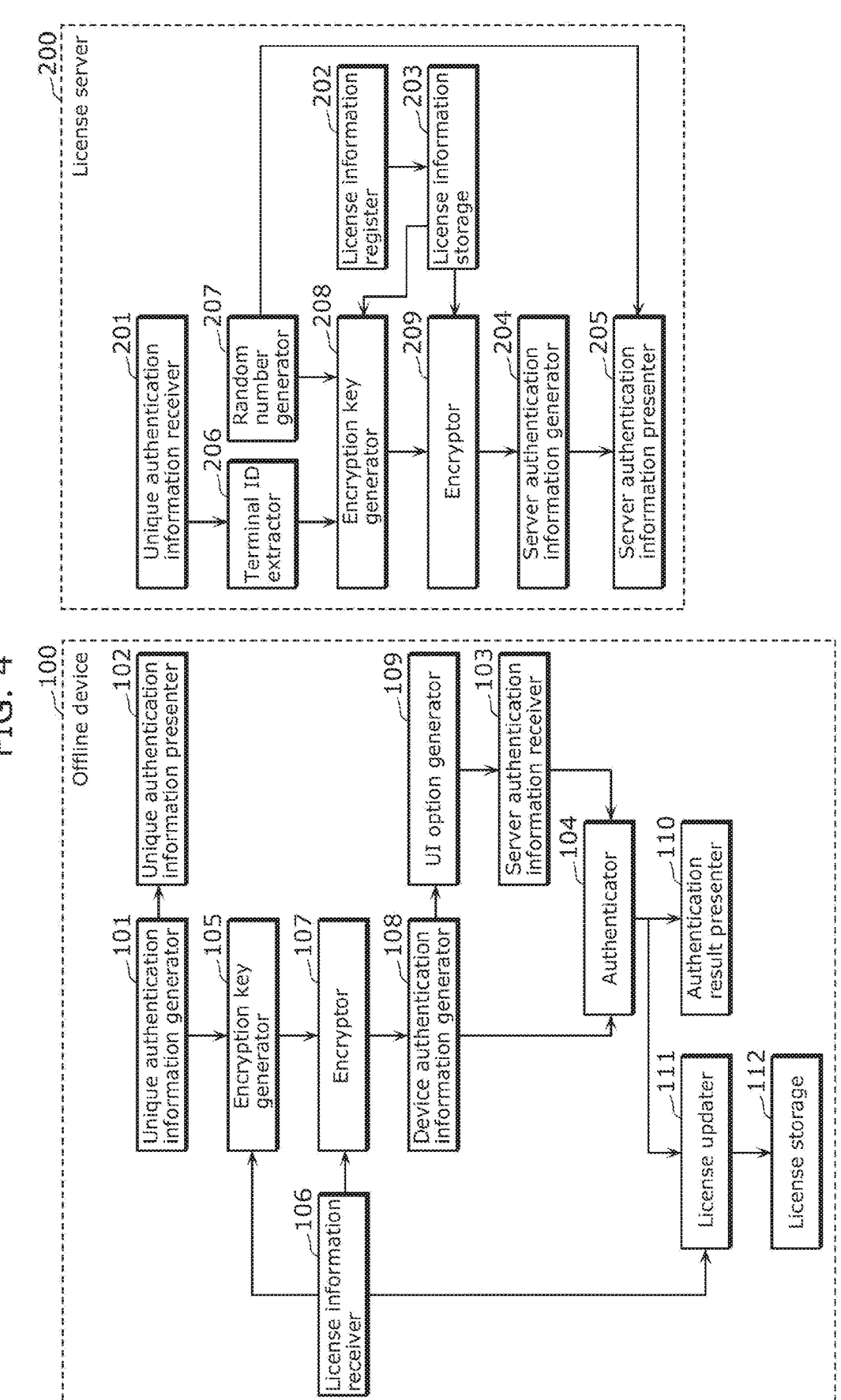
FIG. 4 is a configuration diagram illustrating a first example of the offline device and the license server according to Embodiment.

FIG. 4 is a configuration diagram illustrating the first example of offline device 100 and license server 200 according to Embodiment.

Offline device 100 in the first example includes encryption key generator 105, license information receiver 106, encryptor 107, device authentication information generator 108, UI option generator 109, authentication result presenter 110, license updater 111, and license storage 112, in addition to unique authentication information generator 101, unique authentication information presenter 102, server authentication information receiver 103, and authenticator 104.

License information receiver 106 receives input of the license information.

Encryption key generator 105 generates a device encryption key from the unique authentication information. The device encryption key is an encryption key used for encrypting the license information. For example, encryption key generator 105 generates the device encryption key using the license information. This enhances the security. Note that encryption key generator 105 need not use the license information to generate the device encryption key.

Encryptor 107 encrypts the inputted license information using the device encryption key.

Device authentication information generator 108 generates device authentication information, based on the inputted license information and the unique authentication information. To be more specific, device authentication information generator 108 generates the device authentication information as encryptor 107 encrypts the license information using the device encryption key generated from the unique authentication information. The device authentication information is encrypted text. Note that since decrypting of the device authentication information is unnecessary in the first example, the device authentication information is part of encrypted text (or more specifically, part other than part necessary for decrypting in the encrypted text).

For inputting of the server authentication information to be received by server authentication information receiver 103, UI option generator 109 generates options that are displayed as candidates for the server authentication information to help the inputting of the server authentication information.

Authentication result presenter 110 presents, to the user, an authentication result indicating whether the license authentication is successful. For example, authentication result presenter 110 displays the authentication result on the display.

If the license authentication is successful, license updater 111 updates the license of the software installed on offline device 100, based on the license information. For example, license updater 111 updates the license so that this software can be used on offline device 100 for a span indicated in the license information.

License storage 112 stores the updated license.

License server 200 in the first example includes terminal ID extractor 206, random number generator 207, encryption key generator 208, and encryptor 209, in addition to unique authentication information receiver 201, license information register 202, license information storage 203, server authentication information generator 204, and server authentication information presenter 205.

Terminal ID extractor 206 extracts a terminal ID included in the unique authentication information. Random number generator 207 generates a random number associated with the terminal ID. License server 200 is able to identify the software installed on offline device 100 from the extracted terminal ID and also identify the license information stored in license information storage 203 in association with the software.

Encryption key generator 208 generates a server encryption key from the unique authentication information. The server encryption key is an encryption key used for encrypting the license information. The server encryption key is generated using the unique authentication information generated by offline device 100. In other words, generated from the same unique authentication information, the server encryption key and the device encryption key are identical to each other. For example, encryption key generator 208 generates the server encryption key using the license information and the random number. This enhances the security. Note that encryption key generator 208 need not use the license information to generate the server encryption key.

Encryptor 209 encrypts the license information using the server encryption key. To be more specific, server authentication information generator 204 generates the server authentication information as encryptor 209 encrypts the license information using the server encryption key. The server authentication information is encrypted text. Note that since decrypting of the server authentication information is unnecessary in the first example, the server authentication information is part of encrypted text (or more specifically, part other than part necessary for decrypting in the encrypted text).

Server authentication information presenter 205 presents, to the user, the server authentication information including the random number.

Figure 5:
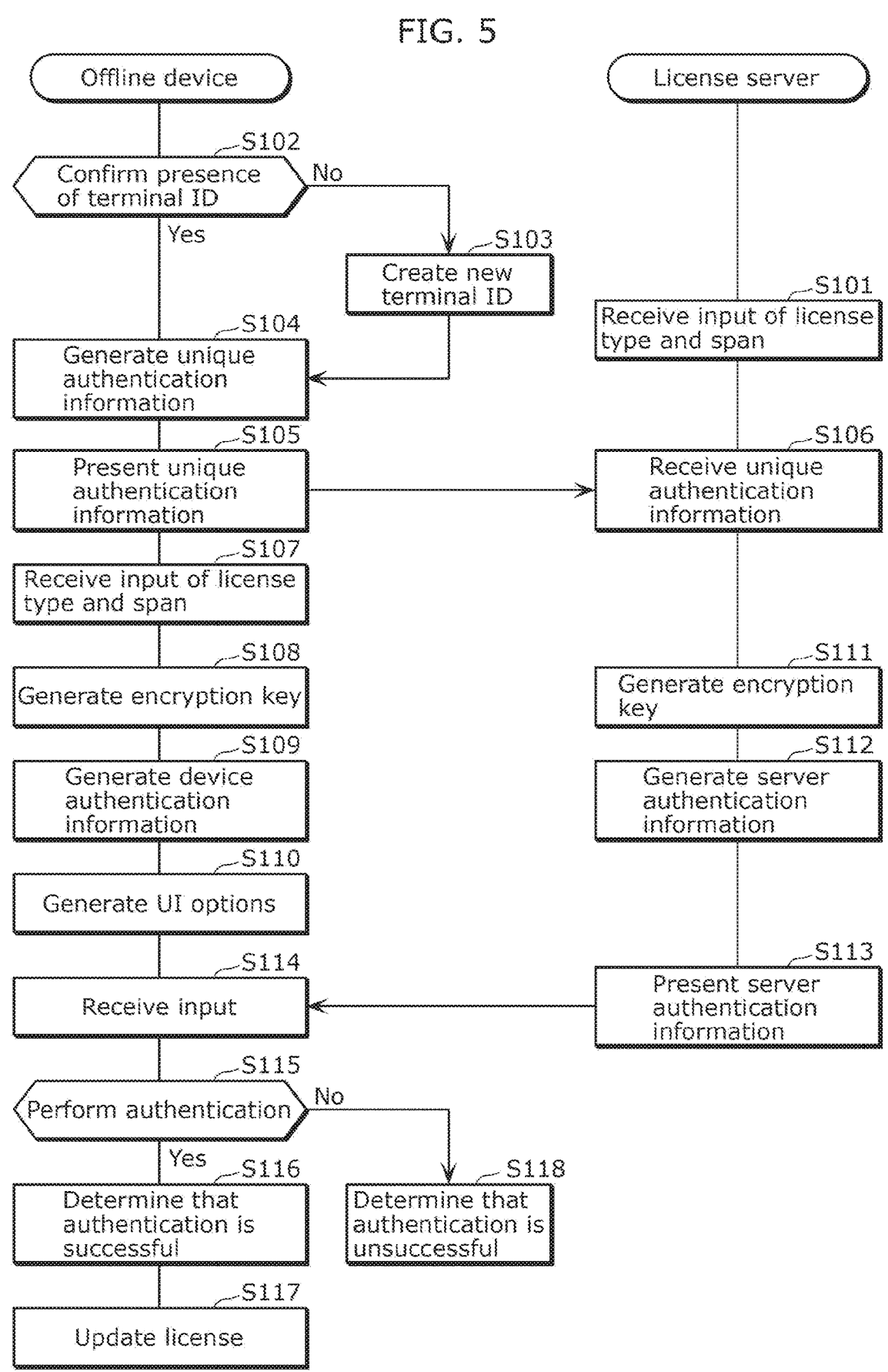
FIG. 5 is a sequence diagram illustrating an example of an operation performed by the offline device and the license server in the first example.

FIG. 5 is a sequence diagram illustrating an example of an operation performed by offline device 100 and license server 200 in the first example. The flowchart on the left-hand side illustrating an example of an operation performed by online device 100 is also a flowchart illustrating an example of the authentication method in the first example.

As the manager of license server 200 inputs the span and type of the license corresponding to the software for example (Step S101), license information register 202 registers the license information corresponding to the software. For example, the process of Step S101 is performed in advance before processes of Step S102 and subsequent steps are performed.

Unique authentication information generator 101 includes a terminal ID storage and a terminal ID generator for example, and determines whether a terminal ID is present in the terminal ID storage (Step S102). If no terminal ID is present in the terminal ID storage (No in Step S102), the terminal ID generator creates a new terminal ID corresponding to the software installed on offline device 100 (Step S103) and stores this terminal ID into the terminal ID storage. If a terminal ID is present in the terminal ID storage (Yes in Step S102), unique authentication information generator 101 generates unique authentication information from the terminal ID (Step S104). Here, an operation performed by offline device 100 to generate the unique authentication information is described with reference to FIG. 6.

Figure 6:
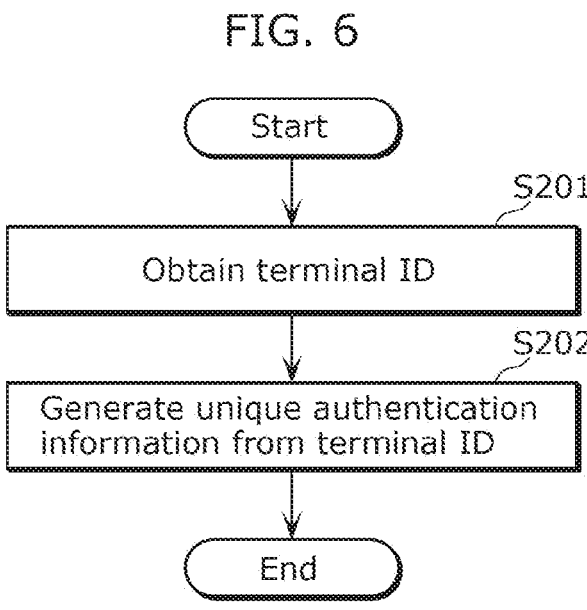
FIG. 6 is a flowchart illustrating an example of an operation performed by the offline device to generate unique authentication information in the first example.

FIG. 6 is a flowchart illustrating an example of the operation performed by offline device 100 to generate the unique authentication information in the first example.

Unique authentication information generator 101 obtains the terminal ID stored in the terminal ID storage (Step S201) and generates unique authentication information from the obtained terminal ID (Step S202). For example, unique authentication information generator 101 defines the terminal ID as the unique authentication information. Note that if offline device 100 generates a random number, the unique authentication information may be information including the terminal ID appended with the random number. More specifically, the unique authentication information may include the random number.

Referring back to FIG. 5, unique authentication information presenter 102 presents the unique authentication information (Step S105). Here, presentation of the unique authentication information is described with reference to FIG. 7.

Figure 7:
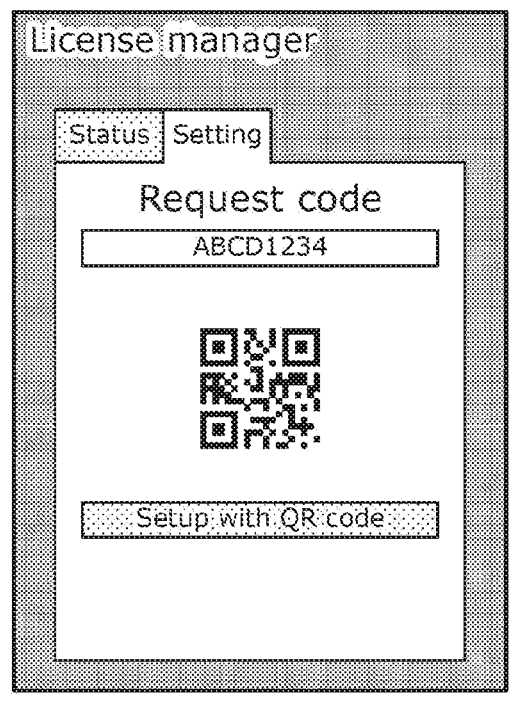
FIG. 7 is a diagram illustrating an example of the presented unique authentication information.

FIG. 7 is a diagram illustrating an example of the presented unique authentication information.

For example, unique authentication information presenter 102 may display a graphic code (such as a QR code [registered trademark]) that includes the unique authentication information in Step S105 (the presenting), as illustrated in FIG. 7. For example, the user is able to transmit the unique authentication information to license server 200 by scanning the displayed graphic code with, for instance, a camera included in online device 300. Alternatively, unique authentication information presenter 102 may display symbols (such as characters "ABCD1234") representing the unique authentication information as illustrated in FIG. 7, for example. The user is able to transmit the unique authentication information to license server 200 by inputting the displayed symbols to online device 300, for example.

Referring back to FIG. 5, unique authentication information receiver 201 receives the unique authentication information (Step S106). As described above, unique authentication information receiver 201 receives the unique authentication information as license server 200 receives the unique authentication information via online device 300, for example.

For example, based on the unique authentication information received by unique authentication information receiver 201, license server 200 refers to the management table that associates the unique authentication information with the license information. Then, among pieces of license information stored in the license information storage, license server 200 identifies the license information (such as the license type and the license span) of the software corresponding to the unique authentication information. The identified license information is presented on a display of online device 300.

License information receiver 106 receives the license information (such as the license type and the license span) as the user inputs the type and span of the license corresponding to the software installed on offline device 100 (S107). Here, presentation and inputting of the license information are described with reference to FIG. 8A and FIG. 8B.

Figures 8A, 8B:
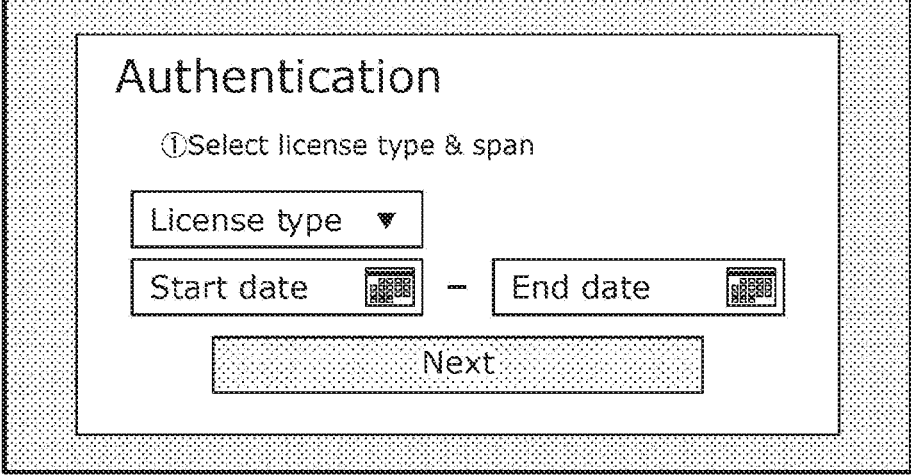
FIG. 8A is a diagram illustrating an example of the presented license information.
FIG. 8B is a diagram illustrating an example of a screen for receiving input of the license information.

FIG. 8A is a diagram illustrating an example of the presented license information.

FIG. 8B is a diagram illustrating an example of a screen for receiving input of the license information.

For example, license server 200 displays the license information as illustrated in FIG. 8A on online device 300. The user inputs the license information displayed on online device 300, on the screen of offline device 100 as illustrated in FIG. 8B. As a result, license information receiver 106 receives the license information.

Referring back to FIG. 5, encryption key generator 105 generates a device encryption key from the unique authentication information (Step S108).

Note that the order in which Step S107 and Step S108 are performed is not intended to be limiting. For example, Step S108 may be performed after Step S107, or Step S107 may be performed after Step S108. Alternatively, Step S107 and Step S108 may be performed concurrently.

Next, device authentication information generator 108 generates device authentication information (Step S109). Here, an operation performed by offline device 100 to generate the device authentication information is described with reference to FIG. 9.

Figure 9:
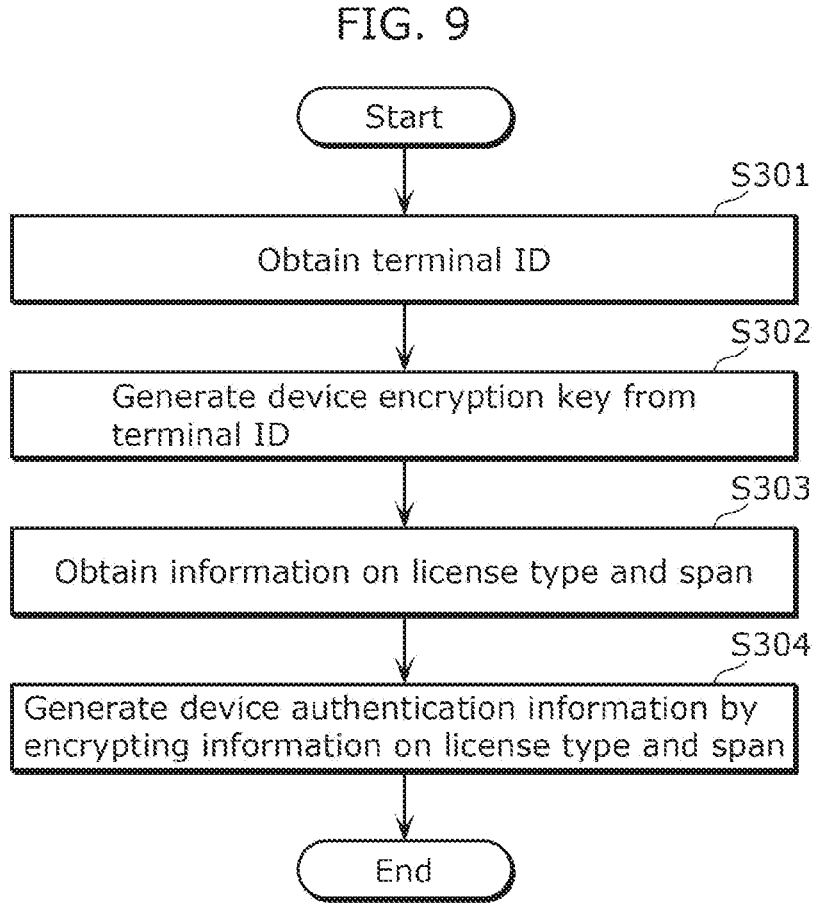
FIG. 9 is a flowchart illustrating an example of an operation performed by the offline device to generate device authentication information in the first example.

FIG. 9 is a flowchart illustrating an example of the operation performed by offline device 100 to generate the device authentication information in the first example.

Encryption key generator 105 obtains the terminal ID (Step S301) and generates a device encryption key from the obtained terminal ID (Step S302). Encryptor 107 obtains the license information (such as the license type and the license span) (Step S303). By encrypting the license information using the device encryption key, device authentication information generator 108 generates the device authentication information (Step S304).

Referring back to FIG. 5, UI option generator 109 generates options that are displayed on a user interface as candidates for the server authentication information, using the generated device authentication information (Step S110). The displayed options are described later by example.

Encryption key generator 208 generates a server encryption key from the unique authentication information (Step S111).

Next, server authentication information generator 204 generates server authentication information (Step S112). Server authentication information presenter 205 presents the server authentication information (Step S113). Here, an operation performed by license server 200 to generate and present the server authentication information is described with reference to FIG. 10.

Figure 10:
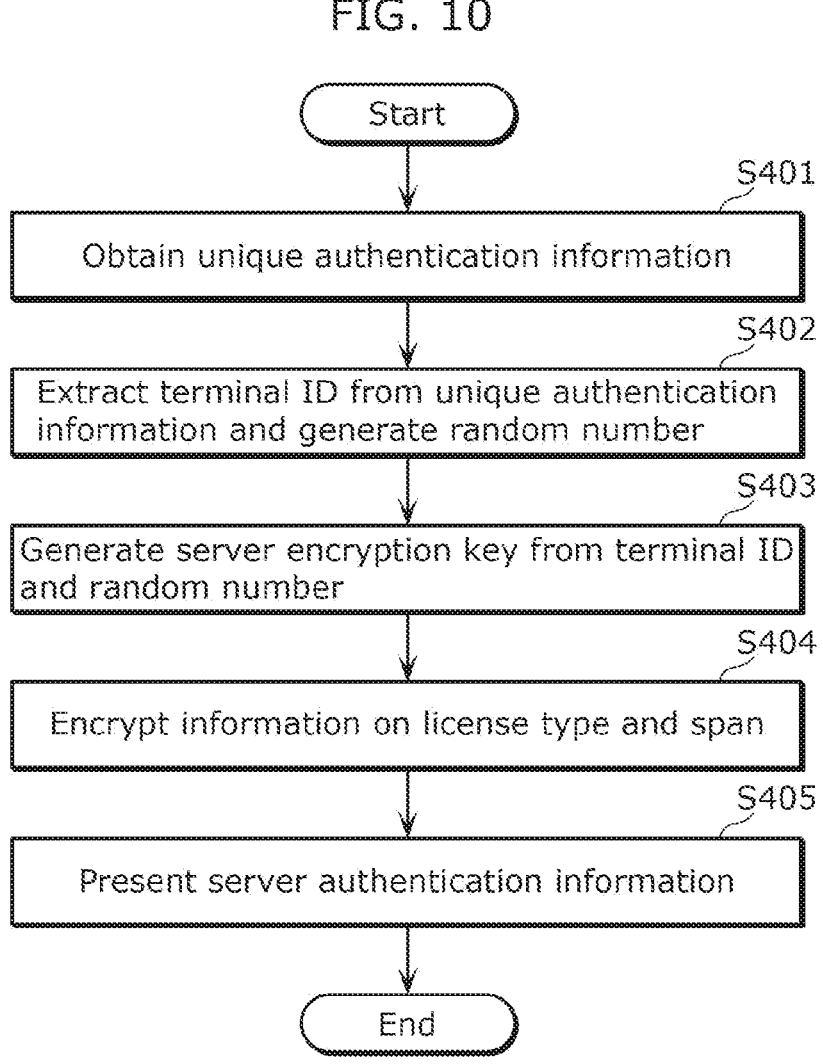
FIG. 10 is a flowchart illustrating an example of an operation performed by the license server to generate and present server authentication information in the first example.

FIG. 10 is a flowchart illustrating an example of the operation performed by license server 200 to generate and present the server authentication information in the first example.

Unique authentication information receiver 201 receives the unique authentication information (Step S401).

Encryption key generator 208 extracts the terminal ID from the unique authentication information and generates a random number (Step S402). Then, encryption key generator 208 generates a server encryption key from the terminal ID and the random number (Step S403).

As server authentication information generator 204 generates the server authentication information as encryptor 209 encrypts the license information (such as the license type and the license span) using the server encryption key (Step S404).

Server authentication information presenter 205 presents the generated server authentication information (Step S405). For example, server authentication information presenter 205 presents the server authentication information including the random number. The presented server authentication information is described later by example.

Note that the order in which a process from Step S107 to Step S110 and a process from Step S111 to Step S113 are performed is not intended to be limiting. For example, the process from Step S111 to Step S113 may be performed after the process from Step S107 to Step S110 is performed. For example, the process from Step S107 to Step S110 may be performed after the process from Step S111 to Step S113 is performed. Alternatively, the process from Step S107 to Step S110 and the process from Step S111 to Step S113 may be performed concurrently.

Server authentication information receiver 103 receives input of the server authentication information (Step S114). Here, presentation and inputting of the server authentication information are described with reference to FIG. 11A and FIG. 11B.

Figures 11A, 11B:
FIG. 11A is a diagram illustrating an example of the presented server authentication information in the first example.
FIG. 11B is a diagram illustrating an example of a screen for receiving input of the server authentication information in the first example.

FIG. 11A is a diagram illustrating an example of the presented server authentication information in the first example.

FIG. 11B is a diagram illustrating an example of a screen for receiving input of the server authentication information in the first example.

For example, license server 200 displays symbols (such as characters "mn69O2u1") representing the server authentication information as illustrated in FIG. 11A on online device 300. The user inputs the server authentication information displayed on online device 300, on the screen of offline device 100 as illustrated in FIG. 11B. As a result, server authentication information receiver 103 receives the server authentication information.

As described above, UI option generator 109 generates, using the device authentication information, the options (such as "J", "m", "A", and "9") displayed as the candidates for the server authentication information on the screen as illustrated in FIG. 11B. Here, the device authentication information that is identical to the server authentication information ("mn69O2u1" for example) is generated by offline device 100 as well. This allows UI option generator 109 to generate the options that include the symbols making up the server authentication information. For "m" that is the first character of the server authentication information for example, UI option generator 109 generates the options that include: "m" that is the correct symbol as the first character of the device authentication information; and "J", "A", and "9" as dummy symbols, none of which is the first character of the device authentication information.

In this way, in Step S114 (receiving the server authentication information), server authentication information receiver 103 presents the correct symbol that makes up the device authentication information and the dummy symbols none of which makes up the device authentication information, and receives input of the symbol selected as the server authentication information from among the presented correct and dummy symbols.

Generated from the same unique authentication information, the device authentication information generated by offline device 100 and the server authentication information generated by license server 200 are identical to each other. This allows offline device 100 to narrow down the server authentication information candidates, which are presented to help the user input the server authentication information, to those including the correct and dummy symbols. As a result, the user can select the correct symbol for the server authentication information from among the narrowed-down candidates. This allows the user to easily input the server authentication information, as compared to selecting the correct symbol from among all possible symbols that can make up the server authentication information. For example, if the total number of possible symbol candidates for the server authentication information is 64 alphanumeric characters, the options can be significantly reduced from the 64 alphanumeric characters. If no keyboard is provided for offline device 100 and thus the server authentication information is inputted via a mouse or a touch panel for example, the correct symbol can be easily selected from among the narrowed-down candidates.

Figure 12A:
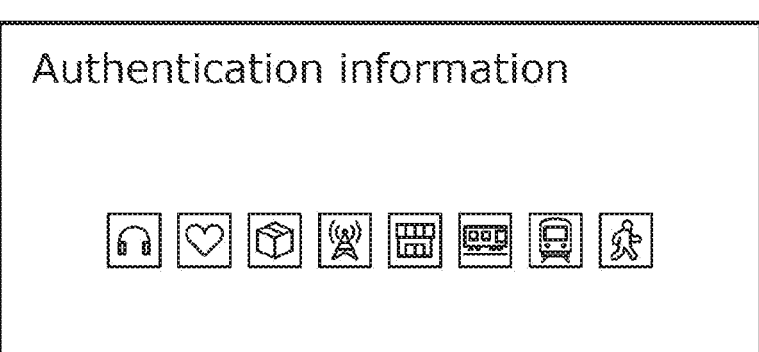
FIG. 12A is a diagram illustrating another example of the presented server authentication information in the first example.

FIG. 12A is a diagram illustrating another example of the presented server authentication information in the first example.

Figure 12B:
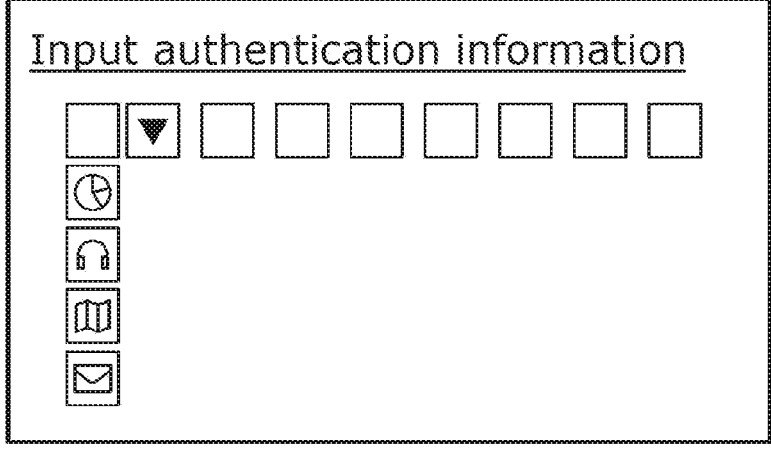
FIG. 12B is a diagram illustrating another example of the screen for receiving input of the server authentication information in the first example.

FIG. 12B is a diagram illustrating another example of the screen for receiving input of the server authentication information in the first example.

As illustrated in FIG. 12A and FIG. 12B, the symbols used as the server authentication information and the device authentication information are not limited to characters and may be graphics, such as pictorial symbols.

Note that server authentication information receiver 103 may receive input of the server authentication information on a plurality of screens. If the server authentication information is to be inputted on one screen for example, a large amount of information has to be displayed on this one screen and thus the user may find it difficult to input the server authentication information on such a screen. However, if the server authentication information is to be inputted separately on the plurality of screens, the amount of information displayed on each screen is reduced, thereby allowing the user to easily input the server authentication information.

Referring back to FIG. 5, authenticator 104 performs license authentication of the software by comparing the inputted server authentication information with the device authentication information (Step S115). To be more specific, authenticator 104 determines whether the inputted server authentication information matches the device authentication information. Generated based on the same unique authentication information, the server authentication information and the device authentication information are identical to each other. If the server authentication information generated based on the unique authentication information is inputted correctly in offline device 100 that generated this unique authentication information for example, the inputted server authentication information matches the device authentication information.

If the inputted server authentication information matches the device authentication information (Yes in Step S115), authenticator 104 determines that the license authentication is successful (Step S116). Thus, license updater 111 updates the license of the software installed on offline device 100 (Step S117). If the inputted server authentication information does not match the device authentication information (No in Step S115), authenticator 104 determines that the license authentication is unsuccessful (Step S118). Thus, license updater 111 does not update the license of the software installed on offline device 100.

Next, the second example of the authentication method according to Embodiment, offline device 100, which performs the authentication method, and license server 200 is described.

Figure 13:
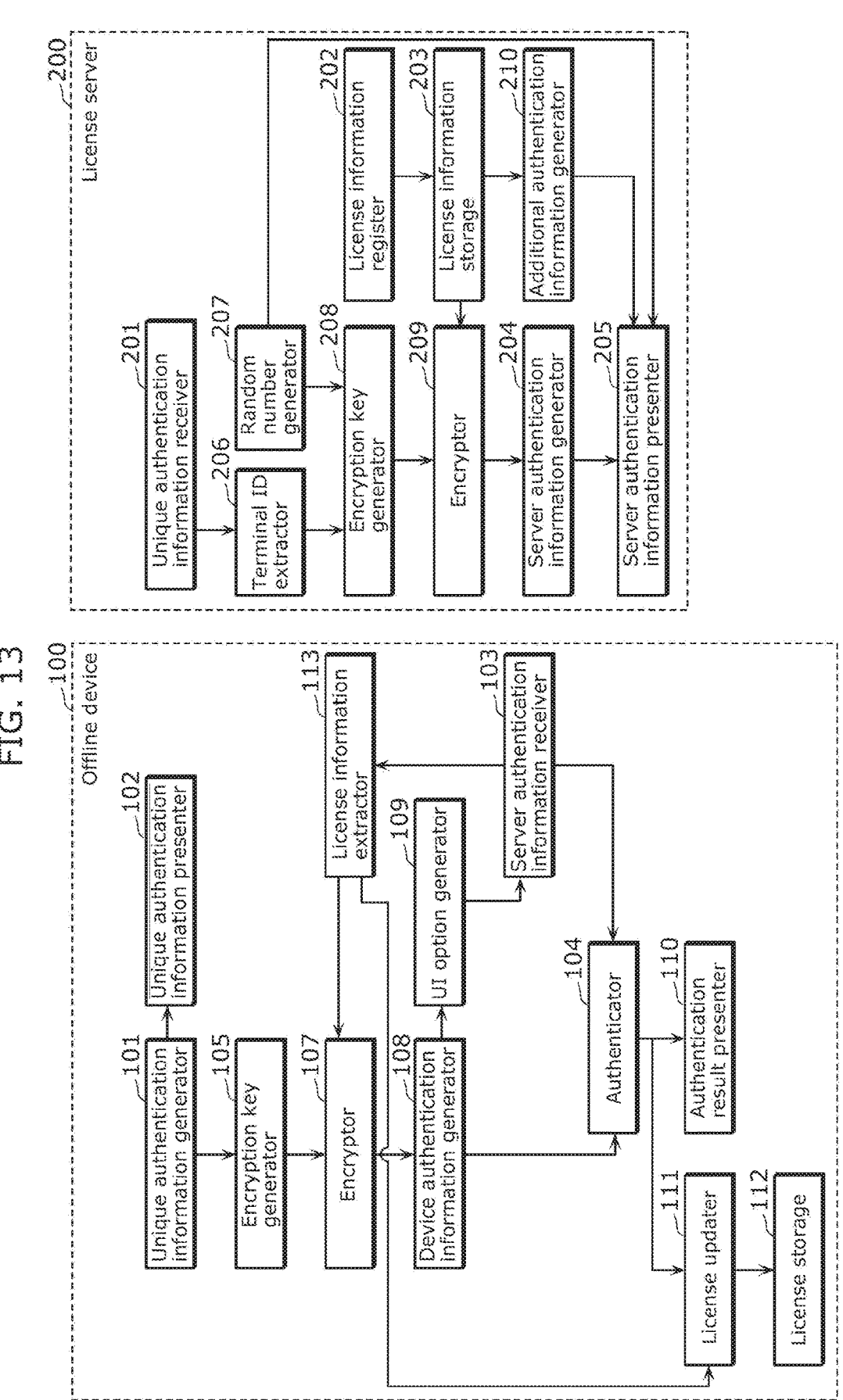
FIG. 13 is a configuration diagram illustrating a second example of the offline device and the license server according to Embodiment.

FIG. 13 is a configuration diagram illustrating the second example of offline device 100 and license server 200 according to Embodiment.

Offline device 100 in the second example includes encryption key generator 105, encryptor 107, device authentication information generator 108, UI option generator 109, authentication result presenter 110, license updater 111, license storage 112, and license information extractor 113, in addition to unique authentication information generator 101, unique authentication information presenter 102, server authentication information receiver 103, and authenticator 104. The second example is different from the first example in that offline device 100 includes license information extractor 113 instead of license information receiver 106. Similarities to the first example are omitted from the following description, and differences from the first example are mainly described.

Server authentication information receiver 103 receives, in addition to the server authentication information, input of additional authentication information generated from the license information by license server 200. More specifically, the authentication method performed by offline device 100 includes receiving additional authentication information, by which input of the additional authentication information generated from the license information by license server 200 is received.

License information extractor 113 extracts the license information from the inputted additional authentication information. More specifically, the authentication method performed by offline device 100 includes extracting license information, by which the license information is extracted from the inputted additional authentication information.

Device authentication information generator 108 generates device authentication information based on the extracted license information and the unique authentication information. To be more specific, device authentication information generator 108 generates the device authentication information as encryptor 107 encrypts the extracted license information using the device encryption key.

License server 200 in the second example includes terminal ID extractor 206, random number generator 207, encryption key generator 208, encryptor 209, and additional authentication information generator 210, in addition to unique authentication information receiver 201, license information register 202, license information storage 203, server authentication information generator 204, and server authentication information presenter 205. The second example is different from the first example in that license server 200 further includes additional authentication information generator 210. Similarities to the first example are omitted from the following description, and differences from the first example are mainly described.

Additional authentication information generator 210 generates additional authentication information from the license information.

Server authentication information presenter 205 presents the additional authentication information in addition to the server authentication information. For example, server authentication information presenter 205 may display the server authentication information and the additional authentication information at the same time (on the same screen, for example). Alternatively, after presenting the additional authentication information, server authentication information presenter 205 may present the server authentication information.

Note that encryption key generator 208 may generate the server encryption key using the additional authentication information in addition to the unique authentication information. In this case, encryption key generator 105 of offline device 100 generates the device encryption key using the additional authentication information in addition to the unique authentication information. This prevents unauthorized usage of the license.

A sequence diagram illustrating an example of an operation performed by offline device 100 and license server 200 in the second example (a flowchart illustrating an example of the authentication method in the second example) is omitted here. The following mainly describes differences from the first example.

FIG. 14 is a flowchart illustrating an example of the operation performed by license server 200 to generate and present the server authentication information in the second example.

Unique authentication information receiver 201 obtains the unique authentication information (Step S401).

Encryption key generator 208 obtains the terminal ID and the random number extracted from the unique authentication information (Step S402).

Additional authentication information generator 210 generates additional authentication information from the license information (such as the license type and the license span) (Step S406).

Encryption key generator 208 generates a server encryption key from the terminal ID and the random number (Step S403). Note that encryption key generator 208 may additionally use the additional authentication information to generate the server encryption key as described above.

Server authentication information generator 204 generates server authentication information as encryptor 209 encrypts the license information (such as the license type and the license span) using the server encryption key (S404).

Server authentication information presenter 205 presents the generated additional authentication information and server authentication information (Step S407). For example, server authentication information presenter 205 presents the server authentication information appended with the random number. The presented additional authentication information and server authentication information are described later by example.

Figure 15:
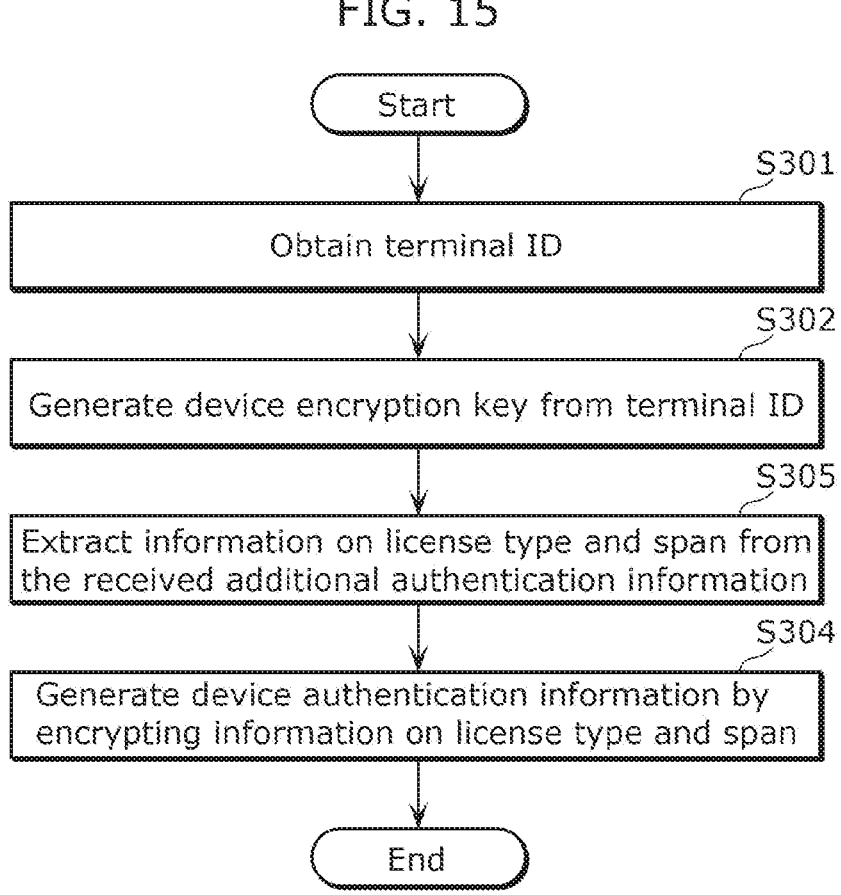
FIG. 15 is a flowchart illustrating an example of the operation performed by the offline device to generate the device authentication information in the second example.

FIG. 15 is a flowchart illustrating an example of the operation performed by offline device 100 to generate the device authentication information in the second example.

Encryption key generator 105 obtains the terminal ID (Step S301), and generates a device encryption key from the obtained terminal ID (Step S302). As described above, encryption key generator 208 of license server 200 may generate the server encryption key additionally using the additional authentication information. Note that, in this case, encryption key generator 105 generates the device encryption key additionally using the additional authentication information. License information extractor 113 extracts the license information (such as the license type and the license span) from the received additional authentication information (Step S305). Then, device authentication information generator 108 generates the device authentication information as encryptor 107 encrypts the extracted license information using the device encryption key (Step S304).

Next, presentation and inputting of the server authentication information in the second example are described with reference to FIG. 16A and FIG. 16B.

Figures 16A, 16B, 16C:
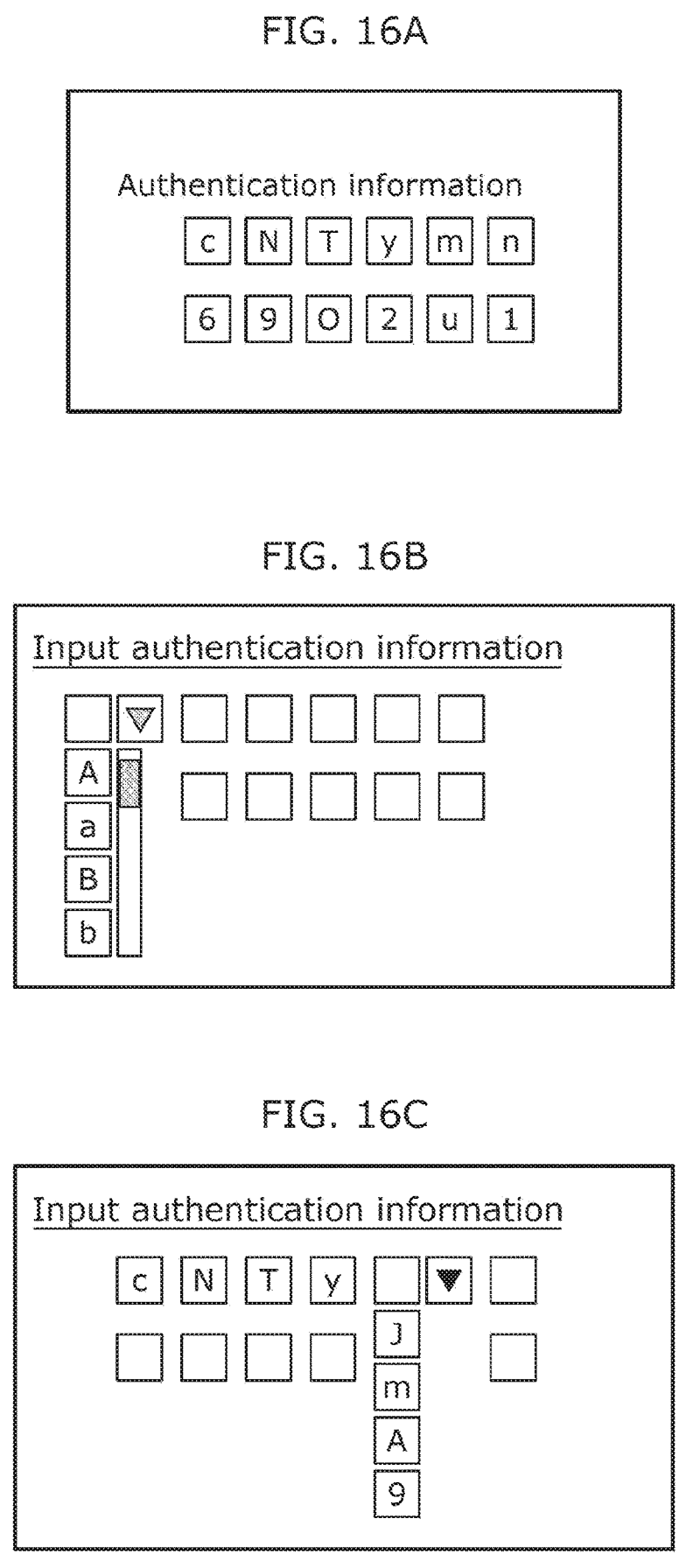

FIG. 16A is a diagram illustrating an example of the presented additional authentication information and server authentication information in the second example.

FIG. 16B is a diagram illustrating an example of a screen for receiving input of the additional authentication information in the second example.

FIG. 16C is a diagram illustrating an example of a screen for receiving input of the server authentication information in the second example.

For example, license server 200 displays, on online device 300, symbols (such as characters "cNTymn69O2u1") representing the additional authentication information and server authentication information as illustrated in FIG. 16A. For example, "cNTy" represents the additional authentication information and "mn69O2u1" represents the server authentication information. Note that the additional authentication information and the server authentication information may be displayed on the same screen as illustrated in FIG. 16A, or may be separately displayed on two screens although not illustrated.

Next, the user inputs the additional authentication information displayed on online device 300, on the screen of offline device 100 as illustrated in FIG. 16B. Here, offline device 100 does not know what kind of additional authentication information is to be inputted. For this reason, UI option generator 109 generates options that include all possible symbols that can make up the additional authentication information. Then, server authentication information receiver 103 presents all the possible symbols that can make up the additional authentication information, and receives input of the symbol selected as the additional authentication information from among all the presented symbols. In FIG. 16B, for "c" that is the first character of the additional authentication information, the options that include all the possible symbols "A", "a", "B", "b", . . . that can make up the additional authentication information are displayed. With this, server authentication information receiver 103 receives the additional authentication information. Furthermore, device authentication information generator 108 generates the device authentication information using the license information extracted from the additional authentication information.

Using the generated device authentication information, UI option generator 109 generates the options (such as "J", "m", "A", and "9") displayed as candidates for the server authentication information on the screen illustrated in FIG. 16C. Note that, before the additional authentication information is inputted, the device authentication information is not yet generated and thus the options for the server authentication information are not yet generated. For this reason, while the additional authentication information ("cNTy" for example) is not yet inputted, inputting of the server authentication information may be set disabled because the options for the server authentication information are not yet presented. For example, even if a field for inputting the server authentication information illustrated in FIG. 16B and FIG. 16C is selected (or more specifically, clicked or tapped), no response may be given.

Here, the device authentication information that is identical to the server authentication information ("mn69O2u1" for example) is generated by offline device 100 as well. This allows UI option generator 109 to generate the options that include the symbols making up the server authentication information. For "m" that is the first character of the server authentication information for example, UI option generator 109 generates the options that include: "m" that is the correct symbol as the first character of the device authentication information; and "J", "A", and "9" as dummy symbols, none of which is the first character of the device authentication information.

In this way, server authentication information receiver 103 presents the correct symbol that makes up the device authentication information and the dummy symbols none of which makes up the device authentication information, and receives input of the symbol selected as the server authentication information from among the presented correct and dummy symbols.

Generated from the same unique authentication information, the device authentication information generated by offline device 100 based on the additional authentication information inputted to offline device 100 and the server authentication information generated by license server 200 are identical to each other. This allows offline device 100 to narrow down the server authentication information candidates, which are presented to help the user input the server authentication information, to those including the correct and dummy symbols. As a result, after inputting the additional authentication information, the user can select the correct symbol for the server authentication information from among the narrowed-down candidates. This allows the user to easily input the server authentication information, as compared to selecting the correct symbol from among all possible symbols that can make up the server authentication information.

Next, the third example of the authentication method according to Embodiment, offline device 100, which performs the authentication method, and license server 200 is described.

Figure 17:
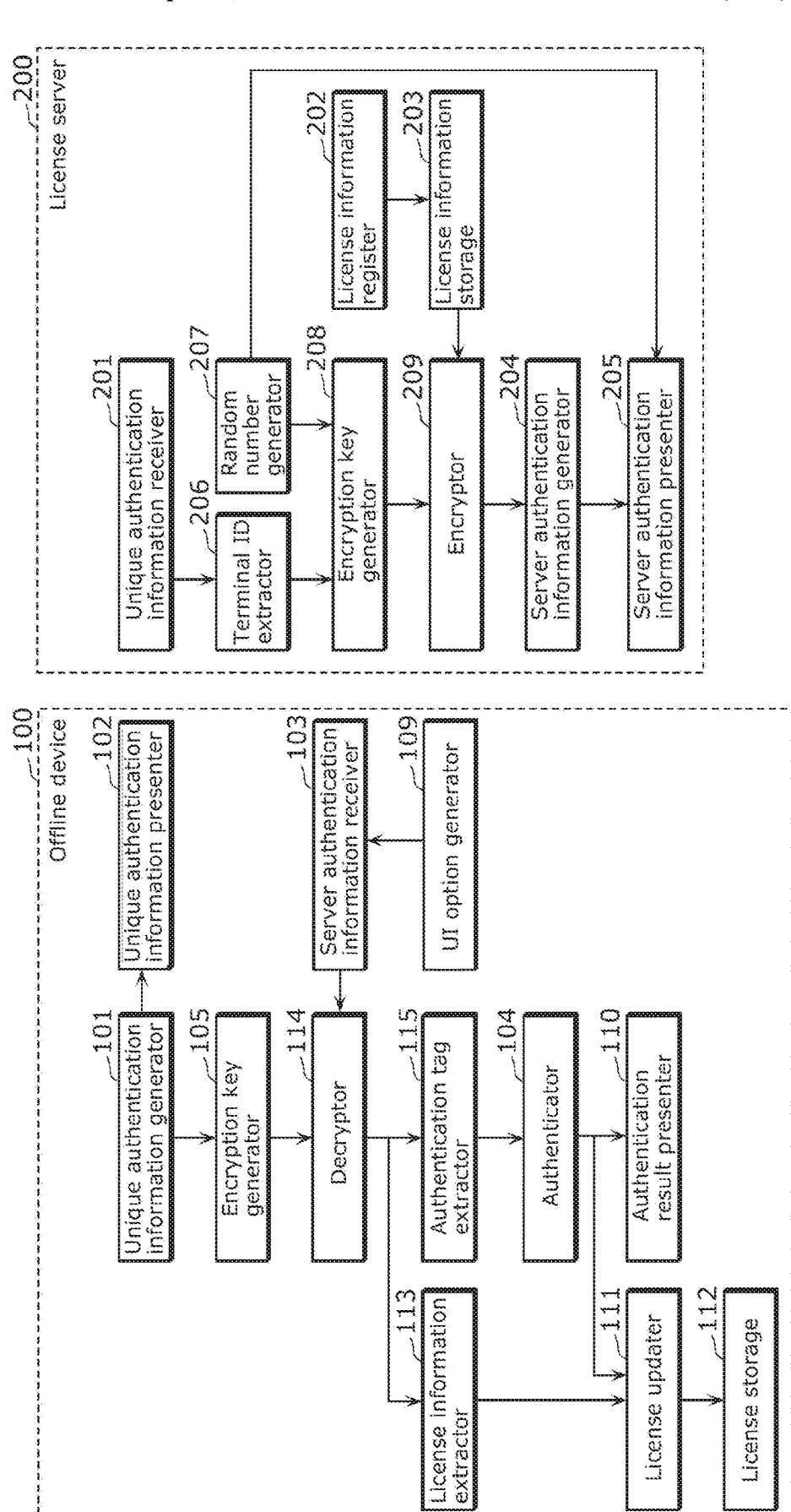
FIG. 17 is a configuration diagram illustrating a third example of the offline device and the license server according to Embodiment.

FIG. 17 is a configuration diagram illustrating the third example of offline device 100 and license server 200 according to Embodiment.

Offline device 100 in the third example includes encryption key generator 105, UI option generator 109, authentication result presenter 110, license updater 111, license storage 112, license information extractor 113, decryptor 114, and authentication tag extractor 115, in addition to unique authentication information generator 101, unique authentication information presenter 102, server authentication information receiver 103, and authenticator 104. The third example is different from the first example in that offline device 100 includes license information extractor 113, decryptor 114, and authentication tag extractor 115 instead of license information receiver 106, encryptor 107, and device authentication information generator 108. Similarities to the first example are omitted from the following description, and differences from the first example are mainly described.

Decryptor 114 decrypts the server authentication information inputted to server authentication information receiver 103, using the device encryption key generated by encryption key generator 105. More specifically, the authentication method performed by offline device 100 includes decrypting, by which the inputted server authentication information is decrypted using the device encryption key.

License information extractor 113 extracts the license information from the decrypted server authentication information. The server authentication information is the encrypted license information. Thus, the decrypted server authentication information includes the license information. This enables license information extractor 113 to extract the license information from the decrypted server authentication information.

Authentication tag extractor 115 extracts an authentication tag from the decrypted server authentication information. The authentication tag is information used for determining whether the encrypted text is correctly decrypted. Offline device 100 and license server 200 have a shared interpretation about this information. The authentication tag is assigned when information is to be encrypted. If the encrypted information is decrypted using the same encryption key that was used for encrypting this information, the authentication tag identified based on the shared interpretation can be extracted. This determines that decrypting is performed correctly. In contrast, if the encrypted information is decrypted using an encryption key different from the encryption key that was used for encrypting this information, the authentication tag identified based on the shared interpretation cannot be extracted. This determines that decrypting is not performed correctly.

Authenticator 104 performs license authentication of the software, depending on whether the inputted server authentication information is correctly decrypted using the device encryption key. If the inputted server authentication information is correctly decrypted using the device encryption key, this means that the device encryption key generated by offline device 100 is identical to the server encryption key generated by license server 200. More specifically, the device encryption key and the server encryption key are generated from the same unique authentication information. This proves the validity of the server authentication information received by server authentication information receiver 103, enabling license authentication. In contrast, if the inputted server authentication information cannot be correctly decrypted using the device encryption key, this means that the server authentication information received by server authentication information receiver 103 is encrypted with an encryption key different from the device encryption key. This proves the invalidity of the server authentication information, disabling license authentication.

License server 200 in the third example includes terminal ID extractor 206, random number generator 207, encryption key generator 208, and encryptor 209, in addition to unique authentication information receiver 201, license information register 202, license information storage 203, server authentication information generator 204, and server authentication information presenter 205. Similarities to the first example are omitted from the following description, and differences from the first example are mainly described.

Encryptor 209 encrypts the license information using the server encryption key. When doing so, encryptor 209 appends the authentication tag, about which offline device 100 and license server 200 have the shared interpretation, to the license information before encrypting the license information. This allows offline device 100 to determine whether the server authentication information is correctly decrypted.

A sequence diagram illustrating an example of an operation performed by offline device 100 and license server 200 in the third example (a flowchart illustrating an example of the authentication method in the third example) is omitted here. Thus, the following mainly describes differences from the first example.

Inputting of server authentication information in the third example is described with reference to FIG. 18.

Figure 18:
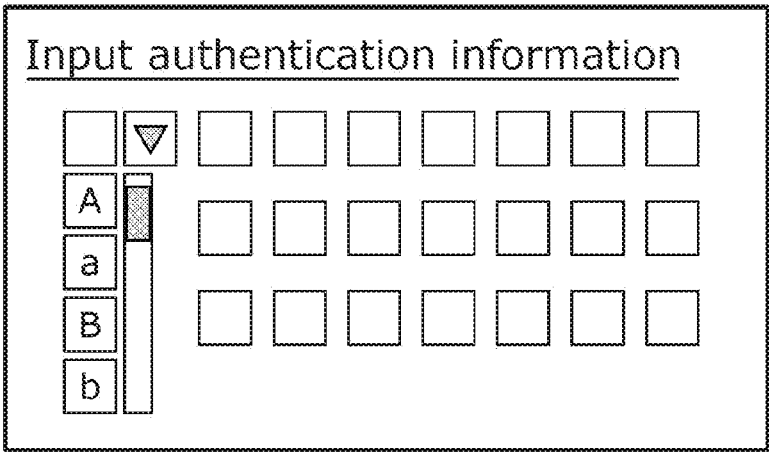
FIG. 18 is a diagram illustrating an example of a screen for receiving input of the server authentication information in the third example.

FIG. 18 is a diagram illustrating an example of a screen for receiving input of the server authentication information in the third example.

Since no device authentication information is generated in the third example, offline device 100 does not know what kind of server authentication information is to be inputted. For this reason, UI option generator 109 generates options that include all possible symbols that can make up the server authentication information. Then, server authentication information receiver 103 presents all the possible symbols that can make up the server authentication information, and receives input of the symbol selected as the server authentication information from among all the presented symbols. In FIG. 18, for the first character of the server authentication information, the options that include all the possible symbols "A", "a", "B", "b", . . . that can make up the server authentication information are displayed.

As described thus far, the license authentication is performed by transmitting the unique authentication information presented by offline device 100 installed with the software to license server 200 and then inputting the server authentication information generated by license server 200 to offline device 100. This enables easy license authentication. For example, inputting of a key code is unnecessary, and this reduces man-hours for license authentication.

Even if only a target device is allowed to perform license authentication, a device other than the target device can possibly perform unauthorized license authentication unfortunately due to disassembling or tampering with unique information. In contrast, the authentication method according to the present embodiment uses the unique authentication information unique to the software. This enables the license authentication without the unique information of offline device 100, such as the media access control (MAC) address or the volume serial number. This reduces the risk of license diversion caused by tampering with the unique information, and thus prevents unauthorized license usage.

For the license authentication in the first example, the user simply inputs the license information and the server authentication information generated by license server 200 to offline device 100 to enable comparison between the inputted server authentication information and the device authentication information generated by offline device 100. In this way, the license authentication can be easily performed.

For the license authentication in the second example, the user simply inputs the additional authentication information and server authentication information generated by license server 200 to offline device 100 without inputting the license information to offline device 100. This enables comparison between the inputted server authentication information and the device authentication information generated by offline device 100 using the license information extracted from the inputted additional authentication information. In this way, the license authentication can be easily performed.

In the first and second example, each of the server authentication information and the device authentication information is encrypted text. Thus, the server authentication information and the device authentication information can be compared with each other without being decrypted from the encrypted text. Furthermore, since decrypting is unnecessary, the server authentication information and the device authentication information can be part of the encrypted text (for example, part other than part necessary for decrypting in the encrypted text). This can reduce the number of symbols necessary to be inputted as the server authentication information.

For the license authentication in the third example, the user simply inputs the server authentication information generated by license server 200 to offline device 100 without inputting the license information to offline device 100. This enables the determination whether the inputted server authentication information is correctly decrypted using the device encryption key generated by offline device 100. In this way, the license authentication can be easily performed.

OTHER EMBODIMENTS

For example, the authentication method may be executed by a computer (computer system). The present disclosure may be implemented to a program that causes the computer to execute the steps included in the authentication method. Furthermore, the present disclosure may be implemented to a non-transitory computer-readable recording medium, such as a CD-ROM, which stores such a program.

For example, the authentication method may be executed by a computer (computer system). The present disclosure may be implemented to a program that causes the computer to execute the steps included in the authentication method. Furthermore, the present disclosure may be implemented to a non-transitory computer-readable recording medium, such as a CD-ROM, which stores such a program.

For example, if the present disclosure is implemented to a program (software), the steps are executed when the program is executed by using hardware resources of the computer, such as a central processing unit (CPU), a memory, and an input/output circuit. In other words, the steps are executed when the CPU acquires data from the memory, the input/output circuit, or the like and performs calculation, or outputs the calculation results to the memory, the input/output circuit, or the like.

Each constituent elements included in offline device 100 and license server 200 according to the above embodiment may be implemented to a large scale integration (LSI) circuit, which is typically an integrated circuit (IC).

Moreover, the method of circuit integration is not limited to LSI. Integration may be realized with a specialized circuit or a general purpose processor. A field programmable gate array (FPGA) or a reconfigurable processor capable of reconfiguring the connections and settings of the circuit cells in the LSI circuit may be used.

Further, if an integrated circuit technology that replaces LSI emerges from advances in or derivations of semiconductor technology, integration of offline device 100 and license server 200 using such technology may also be used.

Furthermore, the authentication process performed by license server 200 (Step S106 and subsequent steps in FIG. 5) may be executed only if it is determined that an application of online device 300 for requesting authentication has a predetermined digital signature. This restricts access from an unauthorized online device.

Furthermore, although presentation of the license information and the server authentication information is illustrated in FIG. 8A and FIG. 11A, these are not intended to be limiting.

FIG. 19 is a diagram illustrating an example of the presented license information and server authentication information according to another embodiment.

As illustrated in FIG. 19, the license information and the server authentication information may be presented at the same time, for example.

Furthermore, although the screen for receiving input of the license information information and the screen for receiving input of the server authentication information are illustrated in FIG. 8B and FIG. 11B, these are not intended to be limiting.

FIG. 20 is a diagram illustrating an example of a screen for receiving input of the license information and input of the server authentication information according to another embodiment.

As illustrated in FIG. 20, a single screen may be displayed for receiving input of both the license information and the server authentication information, for example.

Thus, the embodiment has been described as an example of the technique according to the present disclosure. The accompanying drawings and the detailed description are therefore given.

Therefore, among the constituent elements illustrated in the accompanying drawings and described in the detailed description, there may be constituent elements not essential to solve the problem as well as essential constituent elements. It is therefore not reasonable to easily consider these unessential constituent elements as essential merely because the elements are illustrated in the accompanying drawings or described in the detailed description.

The above embodiment is an example of the technique in the present disclosure, and thus various modifications, substitutions, additions, and omissions are possible in the scope of the claims and equivalent scopes thereof.

[Additional Remarks]

The following technology is disclosed according to the embodiments described thus far.

(Technique 1) An authentication method performed by a device to authenticate a license of software that is installed on the device and managed by a server, the authentication method comprising:

presenting unique authentication information that is unique to the software; receiving input of server authentication information generated by the server based on: license information of the software managed by the server in association with the unique authentication information; and the unique authentication information; and authenticating the license of the software based on the unique authentication information and the server authentication information inputted in the receiving.

With this, the license authentication is performed by transmitting the unique authentication information presented by the device installed with the software to the server and then inputting the server authentication information generated by the server to the device. This enables easy license authentication. For example, inputting of a key code is unnecessary, and this reduces man-hours for license authentication.

(Technique 2) The authentication method according to technique 1, further comprising: receiving input of the license information; and generating device authentication information based on the license information inputted in the receiving and the unique authentication information, wherein the authenticating includes authenticating the license of the software by comparing the server authentication information inputted in the receiving with the device authentication information.

With this, the user simply inputs the license information and the server authentication information generated by the server to the device to enable comparison between the inputted server authentication information and the device authentication information generated by the device. In this way, the license authentication can be easily performed.

(Technique 3) The authentication method according to technique 2, wherein the receiving of the input of the server authentication information includes: presenting a correct symbol included in the device authentication information and a dummy symbol not included in the device authentication information; and receiving input of a symbol selected as the server authentication information from among the correct symbol presented in the presenting and the dummy symbol presented in the presenting.

With this, generated from the same unique authentication information, the device authentication information generated by the device and the server authentication information generated by the server are identical to each other. This allows the device to narrow down the server authentication information candidates, which are presented to help the user input the server authentication information, to those including the correct and dummy symbols. As a result, the user can select the correct symbol for the server authentication information from among the narrowed-down candidates. This allows the user to easily input the server authentication information, as compared to selecting the correct symbol from among all possible symbols that can make up the server authentication information.

(Technique 4) The authentication method according to technique 1, further comprising: receiving input of additional authentication information generated from the license information by the server; extracting the license information from the additional authentication information inputted in the receiving; and generating device authentication information, based on the license information extracted in the extracting and the unique authentication information, wherein the authenticating includes authenticating the license of the software by comparing the server authentication information inputted in the receiving with the device authentication information.

With this, the user simply inputs the additional authentication information and server authentication information generated by the server to the device without inputting the license information to the device. This enables comparison between the inputted server authentication information and the device authentication information generated by the device using the license information extracted from the inputted additional authentication information. In this way, the license authentication can be easily performed. Furthermore, since the authentication information is not stored previously into a memory area of the server, leakage of the authentication information through unauthorized access can be prevented. This increases security.

(Technique 5) The authentication method according to technique 4, wherein the receiving of the input of the additional authentication information includes: presenting all possible symbols included in the additional authentication information; and receiving input of a symbol selected as the additional authentication information from among the all possible symbols presented in the presenting, and the receiving of the input of the server authentication information includes: presenting a correct symbol included in the device authentication information and a dummy symbol not included in the device authentication information; and receiving input of a symbol selected as the server authentication information from among the correct symbol presented in the presenting and the dummy symbol presented in the presenting.

With this, generated from the same unique authentication information, the device authentication information generated by the device based on the additional authentication information inputted to the device and the server authentication information generated by the server are identical to each other. This allows the device to narrow down the server authentication information candidates, which are presented to help the user input the server authentication information, to those including the correct and dummy symbols. As a result, after inputting the additional authentication information, the user can select the correct symbol for the server authentication information from among the narrowed-down candidates. This allows the user to easily input the server authentication information, as compared to selecting the correct symbol from among all possible symbols that can make up the server authentication information.

(Technique 6) The authentication method according to technique 1, wherein the server authentication information is generated by the server encrypting the license information using a server encryption key generated from the unique authentication information, the authentication method further comprises: generating a device encryption key from the unique authentication information;

and decrypting the server authentication information inputted in the receiving, using the device encryption key, and the authenticating includes authenticating the license of the software, depending on whether the server authentication information inputted in the receiving is correctly decrypted using the device encryption key.

With this, the user simply inputs the server authentication information generated by the server to the device without inputting the license information to the device. This enables the determination whether the inputted server authentication information is correctly decrypted using the device encryption key generated by the device. In this way, the license authentication can be easily performed.

(Technique 7) The authentication method according to any one of techniques 2 to 5, wherein the server authentication information is generated by the server encrypting the license information using a server encryption key generated from the unique authentication information, and the generating of the device authentication information includes: generating a device encryption key from the unique authentication information; and encrypting the license information using the device encryption key.

With this, the server encryption key and the device encryption key are generated from the same unique authentication information, and thus are identical to each other. By encrypting the same license information using these identical keys, the server authentication information and the device authentication information that are identical to each other are generated. Hence, the license authentication can be performed through comparison between the server authentication information and the device authentication information.

(Technique 8) The authentication method according to technique 7, wherein each of the server authentication information and the device authentication information is part of encrypted text.

With this, the server authentication information and the device authentication information can be compared with each other without being decrypted from the encrypted text. Furthermore, since decrypting is unnecessary, the server authentication information and the device authentication information can be part of the encrypted text (for example, part other than part necessary for decrypting in the encrypted text). This can reduce the number of symbols necessary to be inputted as the server authentication information.

(Technique 9) The authentication method according to any one of techniques 1 to 8, wherein the receiving of the input of the server authentication information includes receiving the input of the server authentication information divided into a plurality of items separately on a plurality of screens.

If the server authentication information is to be inputted on one screen for example, a large amount of information has to be displayed on this one screen and thus the user may find it difficult to input the server authentication information on such a screen. However, if the server authentication information is to be inputted separately on the plurality of screens, the amount of information displayed on each screen is reduced, thereby allowing the user to easily input the server authentication information.

(Technique 10) The authentication method according to any one of techniques 1 to 9, wherein the presenting of the unique authentication information includes displaying a graphic code including the unique authentication information.

With this, by simply taking a screenshot of the presented graphic code, the unique authentication information can be transmitted to the server.

(Technique 11) The authentication method according to any one of techniques 1 to 10, wherein the server authentication information includes a random number.

This can enhance the security of the server authentication information.

(Technique 12) The authentication method according to any one of techniques 1 to 10, wherein the unique authentication information includes a random number.

This can enhance the security of the unique authentication information.

(Technique 13) The authentication method according to any one of techniques 1 to 12, wherein the license information includes information indicating a span of the license of the software.

Thus, the license information may be information indicating the license span.

(Technique 14) A non-transitory computer-readable recording medium having recorded thereon a computer program for causing a computer to execute the authentication method according to any one of techniques 1 to 13.

With this, a recoding medium that enables easy license authentication can be provided.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a technology of authenticating a license of software installed on a device that is not connected to the Internet.

The invention claimed is:
1. An authentication method performed by a device to authenticate a license of software that is installed on the device and managed by a server, the authentication method comprising:

presenting unique authentication information to a user, the unique authentication information being unique to the software;

receiving input of server authentication information on the device, the server authentication information being generated by the server based on license information of the software and the unique authentication information transmitted to the server, the license information being managed by the server in association with the unique authentication information;

generating device authentication information based on the unique authentication information and the license information inputted on the device; and authenticating the license of the software based on the unique authentication information and the server authentication information inputted on the device, wherein the receiving of the input of the server authentication information on the device includes:

presenting a correct symbol and a dummy symbol to the user, the correct symbol being included in the device authentication information and the dummy symbol being not included in the device authentication information; and receiving input of a symbol selected as the server authentication information from among the correct symbol and the dummy symbol.

2. The authentication method according to claim 1, further comprising receiving input of the license information on the device, wherein the authenticating includes authenticating the license of the software by comparing the server authentication information inputted on the device with the device authentication information.

3. The authentication method according to claim 1, further comprising:

receiving input of additional authentication information on the device, the additional authentication information being generated from the license information by the server;

extracting the license information from the additional authentication information inputted on the device; and generating the device authentication information based on the license information extracted in the extracting and the unique authentication information, wherein the authenticating includes authenticating the license of the software by comparing the server authentication information inputted on the device with the device authentication information.

4. The authentication method according to claim 3, wherein the receiving of the input of the additional authentication information on the device includes:

presenting all possible symbols to the user, the all possible symbols being included in the additional authentication information; and receiving input of a symbol selected as the additional authentication information from among the all possible symbols.

5. The authentication method according to claim 1, wherein the server authentication information is generated by the server encrypting the license information using a server encryption key generated from the unique authentication information, the authentication method further comprises:

generating a device encryption key from the unique authentication information; and decrypting the server authentication information inputted on the device using the device encryption key, and the authenticating includes authenticating the license of the software depending on whether the server authentication information inputted on the device is correctly decrypted using the device encryption key.

6. The authentication method according to claim 1, wherein the server authentication information is generated by the server encrypting the license information using a server encryption key generated from the unique authentication information, and the generating of the device authentication information includes:

generating a device encryption key from the unique authentication information; and encrypting the license information inputted on the device using the device encryption key.

7. The authentication method according to claim 6, wherein each of the server authentication information and the device authentication information is part of encrypted text.

8. The authentication method according to claim 1, wherein the receiving of the input of the server authentication information on the device includes receiving the input of the server authentication information divided into a plurality of items separately on a plurality of screens.

9. The authentication method according to claim 1, wherein the presenting of the unique authentication information includes displaying a graphic code including the unique authentication information.

10. The authentication method according to claim 1, wherein the server authentication information includes a random number.

11. The authentication method according to claim 1, wherein the unique authentication information includes a random number.

12. The authentication method according to claim 1, wherein the license information includes information indicating a span of the license of the software.

13. A non-transitory computer-readable recording medium having recorded thereon a computer program for causing a computer to execute the authentication method according to claim 1.

14. An authentication method performed by a device to authenticate a license of software that is installed on the device and managed by a server, the authentication method comprising:

receiving input of server authentication information on the device, the server authentication information being generated by the server based on license information of the software and unique authentication information transmitted to the server, the license information being managed by the server in association with the unique authentication information, and the unique authentication information being unique to the software;

generating device authentication information based on the unique authentication information and the license information inputted on the device; and authenticating the license of the software based on the unique authentication information and the server authentication information inputted on the device, wherein the receiving of the input of the server authentication information on the device includes:

presenting a correct symbol and a dummy symbol to a user, the correct symbol being included in the device authentication information and the dummy symbol being not included in the device authentication information; and receiving input of a symbol selected as the server authentication information from among the correct symbol and the dummy symbol.

\* \* \* \* \*